United States Patent [19]

Hilby et al.

[11] Patent Number: 5,052,808
[45] Date of Patent: Oct. 1, 1991

[54] METHOD AND APPARATUS FOR INTERFEROMETRIC ROTATION SENSOR PHASE MODULATION, INTENSITY DEMODULATION, AND CONTROL

[75] Inventors: Timothy R. Hilby, Pleasant Hill; James E. Squatrito, Canoga Park; Ray D. Dykeman, Agoura Hills, all of Calif.

[73] Assignee: Litton Systems, Inc., Woodland Hills, Calif.

[21] Appl. No.: 480,254

[22] Filed: Feb. 15, 1990

[51] Int. Cl.$^5$ .............................................. G01C 19/64
[52] U.S. Cl. .................................................. 356/350
[58] Field of Search ........................................ 356/350

[56] References Cited

FOREIGN PATENT DOCUMENTS 2152207  5/1985  United Kingdom ................. 356/350

Primary Examiner—Vincent P. McGraw

[57] ABSTRACT

A method and apparatus are disclosed for closed-loop phase modulation, intensity demodulation, control, and estimation of the non-reciprocal phase shift induced in a rotation sensing interferometer with a reciprocal phase modulator near one end of a closed light path. A bias modulation signal and a feedback modulation signal are generated, and the two signals are summed to form a summed signal which is applied to the phase modulator. The step transition frequency of the bias modulation signal is chosen so as not to fall on even harmonics of the proper frequency $f_p = \frac{1}{2}\tau_0$. The feedback modulation signal can consist of any periodic amplitude-modulated square wave with spectral frequency components at harmonics of the bias modulation step transition frequency. The spectral power of the feedback modulation signal must be distributed across frequencies other than even harmonics of the proper frequency $f_p$.

69 Claims, 22 Drawing Sheets

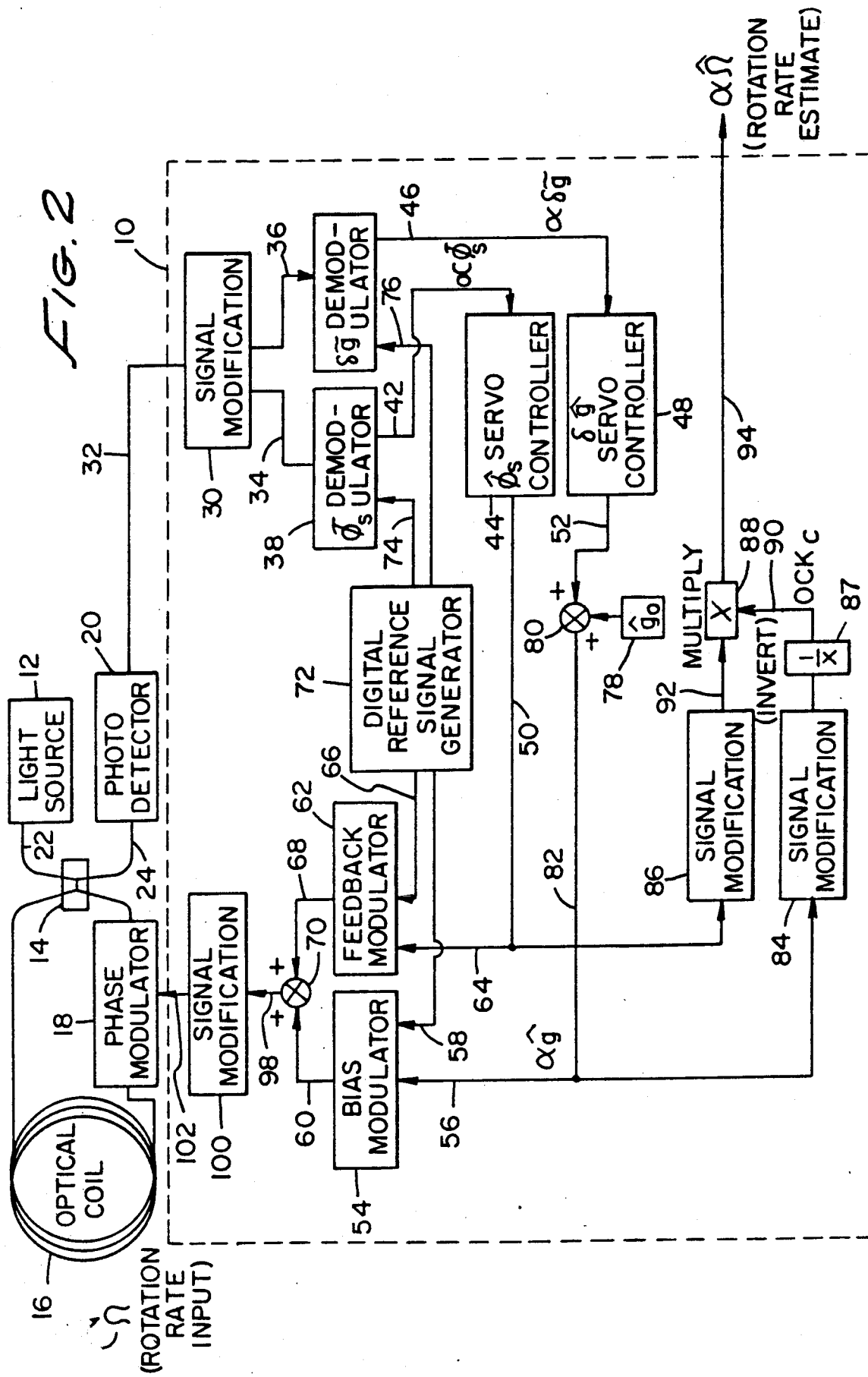

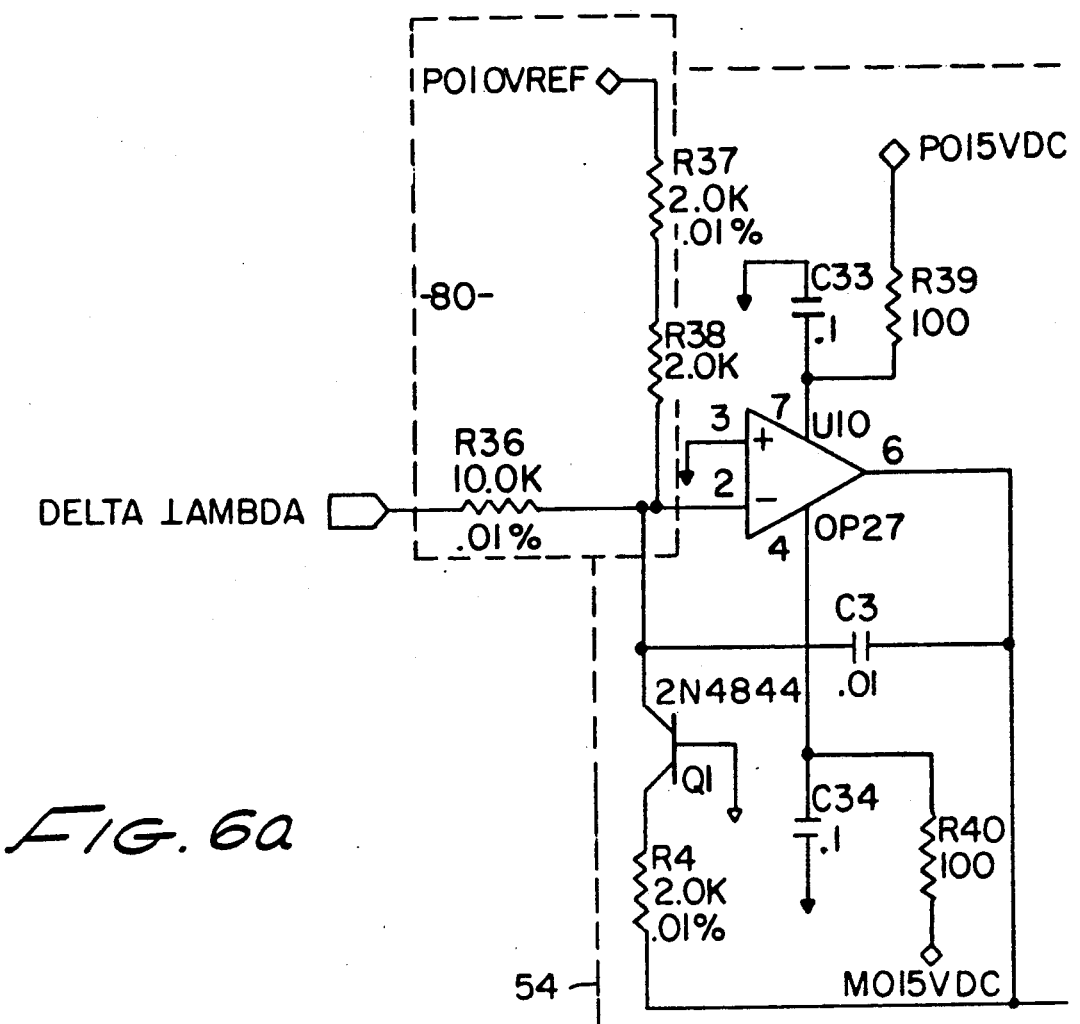
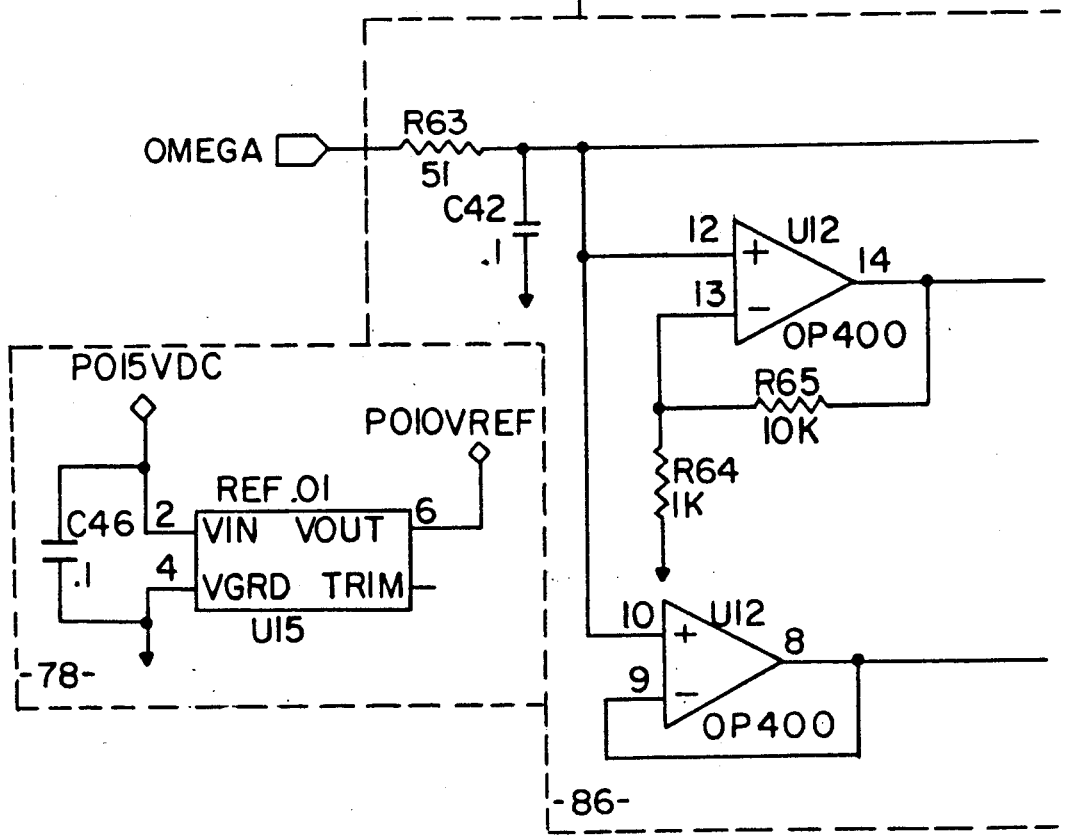
FIG. 6a

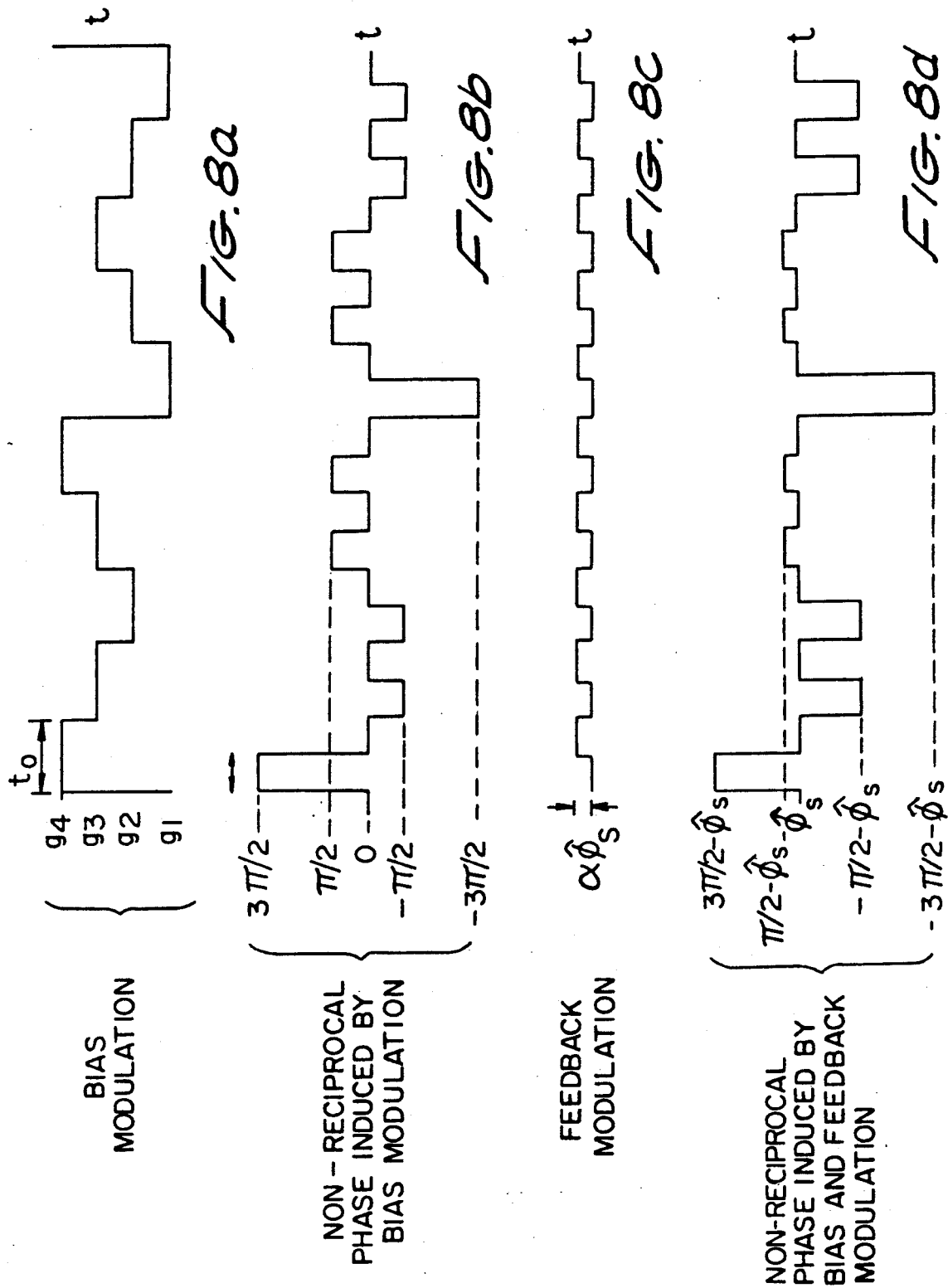

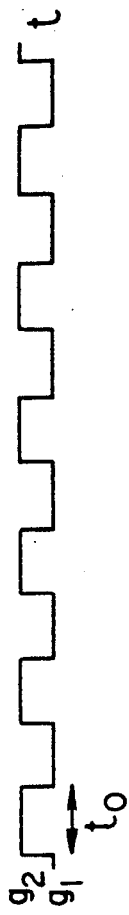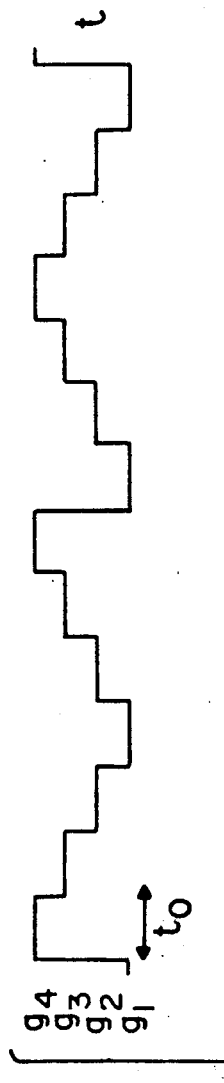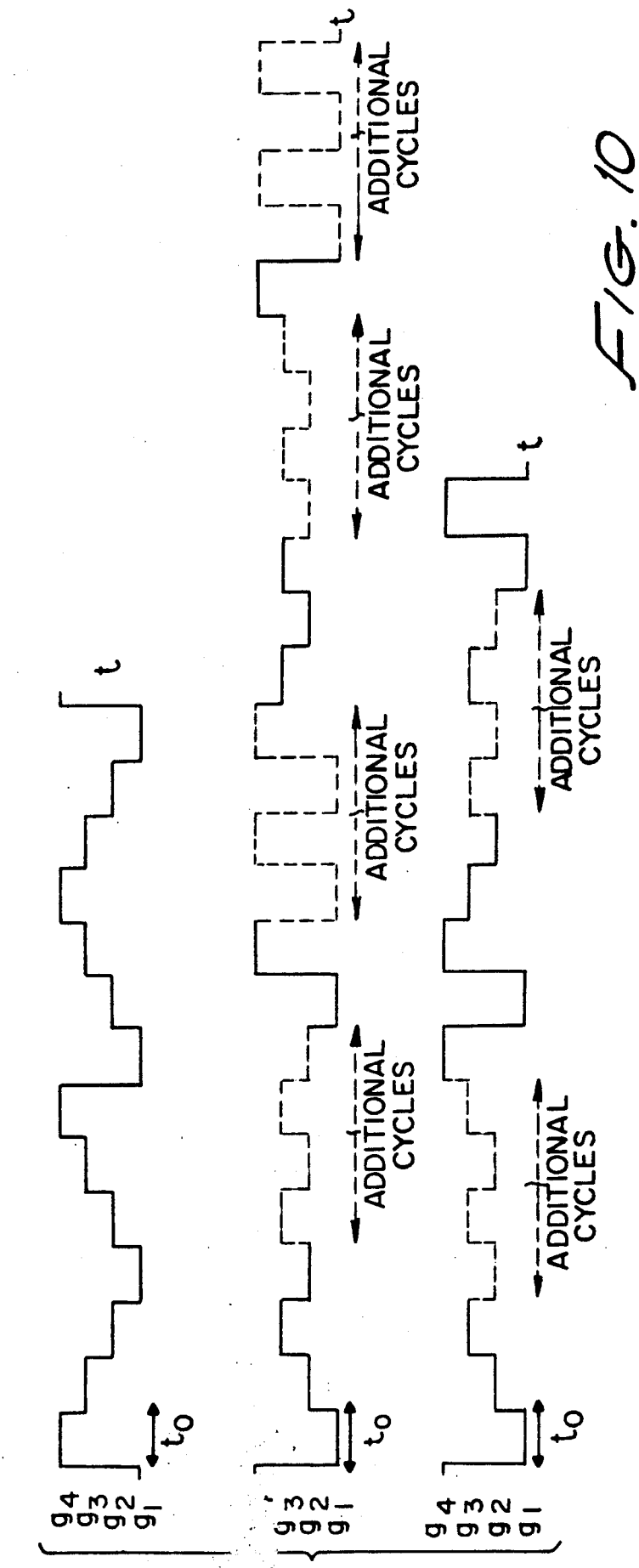
FIG. 9
FIG. 10

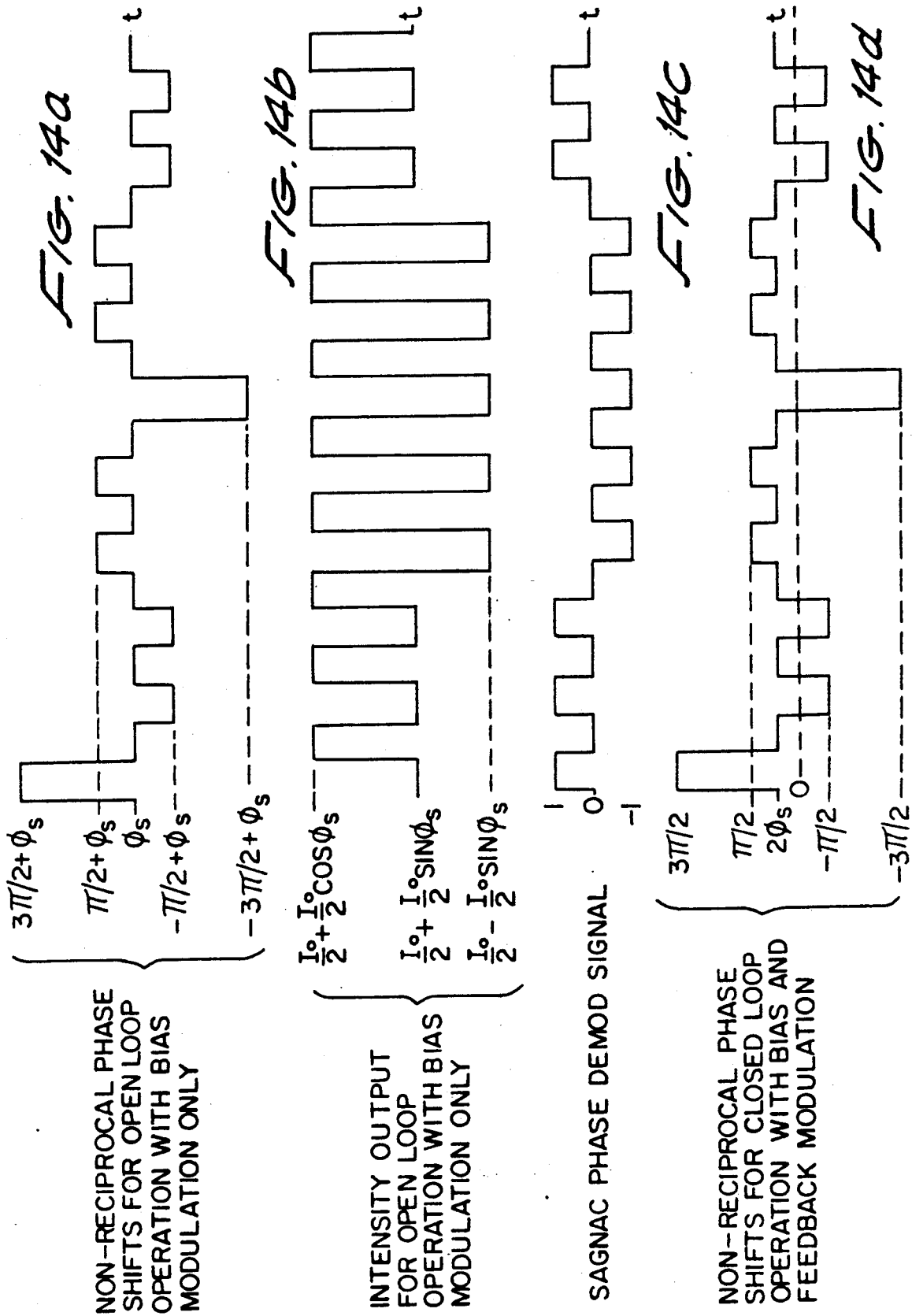

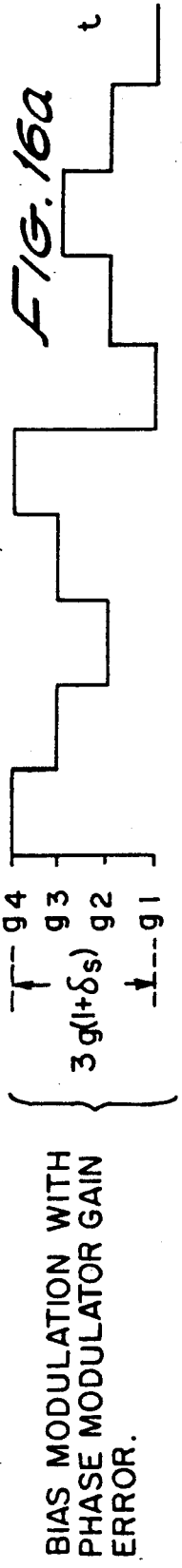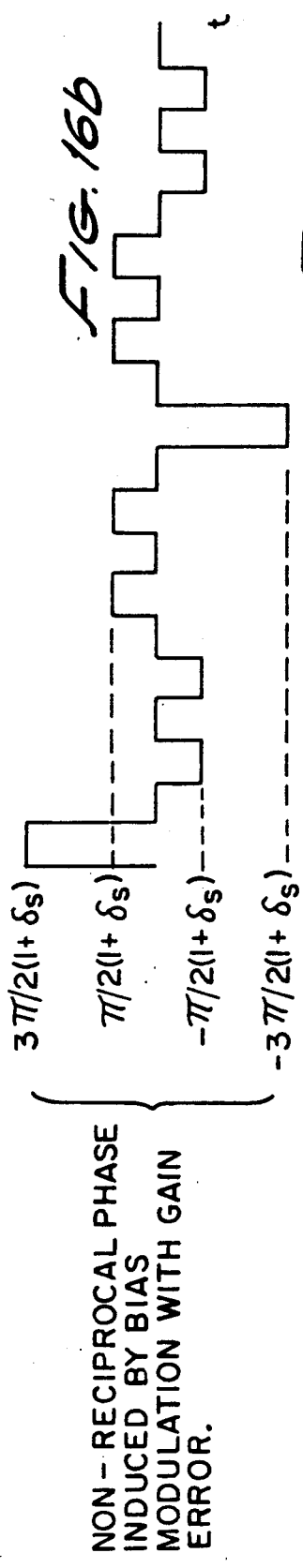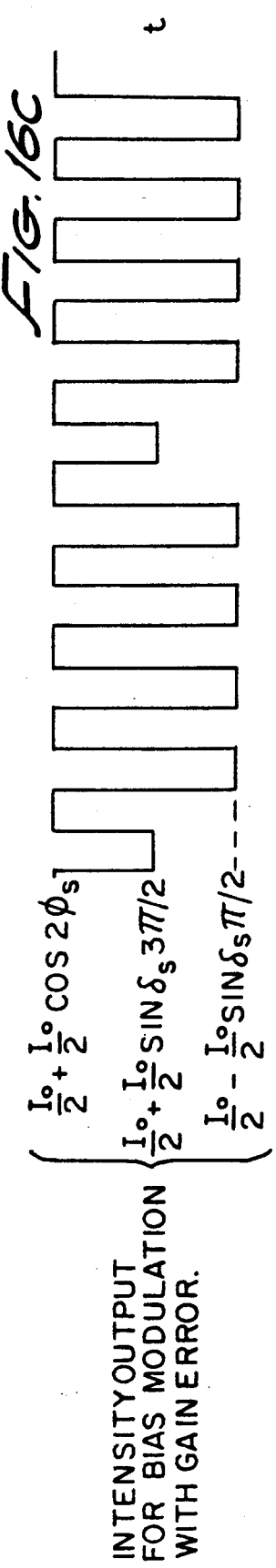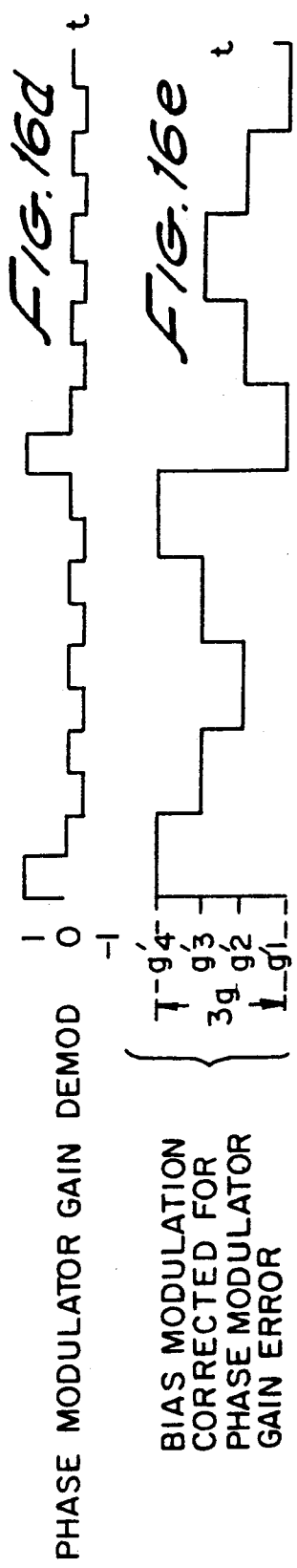

METHOD AND APPARATUS FOR INTERFEROMETRIC ROTATION SENSOR PHASE MODULATION, INTENSITY DEMODULATION, AND CONTROL

BACKGROUND OF THE INVENTION

1. Field of the Invention

The invention relates generally to optical waveguide rotation sensors, and especially to apparatus and methods of measuring the rotation-induced phase shift between light waves counterpropagating in the closed path of a Sagnac interferometer to determine rate of rotation.

2. Description to the Related Art

An optical interferometer used for rotation sensing and measurement generally comprises a coherent source of light, a closed optical path, means for coupling light from the source into and out of the closed path, and means for detecting and processing the optical interference signal coming from the closed path.

There are two types of disturbances in an optical path that can give rise to phase shifts in light waves traveling in opposite directions around a closed optical path: reciprocal and non-reciprocal. A reciprocal disturbance is one that affects either light wave in a similar manner despite the fact that the two waves are traveling in different directions and may be subjected to the disturbance at different times. A non-reciprocal disturbance affects the two waves differently, either because it occurs over a time interval comparable to the time it takes a wave to travel around the closed path, or because the effect it has on a wave depends on the direction of propagation of the wave around the closed path.

The Sagnac effect, a relativistic physical phenomenon, is a non-reciprocal effect in which the rotation of a closed optical path causes light waves propagating in opposite directions along the path to take different amounts of time to complete a transit of the closed path. This difference in transit time results in a phase difference between the two light waves proportional to rotation rate. When the beams are recombined on a photodetector, they give rise to an interference pattern which is a function of the non-reciprocal phase shift. Measurement of the phase difference is a measure of the rate of rotation of the optical path.

If $\phi_S$ denotes the Sagnac phase difference between the recombined counterpropagating light beams, the intensity of light due to the interfering beams varies as $\cos(\phi_S)$. When the phase difference is close to zero, the cosine function varies only slightly with changes in phase difference. In addition, it is impossible to determine the sign of the phase shift from the intensity variation. In order to increase the sensitivity of detection, it is advantageous to introduce artificially an added fixed phase shift or "bias" to shift to a point of operation on the cosine curve where the rate of change of intensity with respect to $\phi_S$ is greater. In particular, maximum sensitivity and linearity of response are achieved by introducing a non-reciprocal phase bias such as $\pi/2$ radians. At this point, the light intensity is proportional to $\cos(\phi_S + \pi/2) = \sin(\phi_S)$. The periodic nature of the cosine function results in an equivalent maximum sensitivity and linearity of response (apart from algebraic sign) at any odd integral multiple of plus or minus $\pi/2$.

It has proven difficult to a construct a device for introducing a non-reciprocal phase bias which is sufficiently stable. However, non-reciprocal phase shifts may be temporarily induced by a reciprocal phase modulator placed near one end of the optical circuit.

A phase modulator device can be based, for example, on the change in refractive index with applied voltage in an electro-optic crystal forming part of the closed optical path of the interferometer. If the phase modulator is placed near one end of the fiber coil, application of a voltage to the modulator produces a modulation of the phase of one of the counterpropagating waves entering the loop that is not experienced by the other until it has traveled all the way around the coil. The second wave experiences a phase modulation which is delayed by the length of time required for light to propagate around the coil, a time given by $$\tau_o = nL/c,$$

where n is the index of refraction of the fiber material, L is the length of the fiber coil, and c is the speed of light in vacuum. If V(t) is a time-varying signal applied to the phase modulator, the phase difference between the counterpropagating light waves is proportional to $V(t) - V(t - \tau_o)$. In this way a phase bias can be produced which sets the operating point of the interferometer.

If there is a rotation of the fiber coil, a phase shift $\phi_S$ will be added to the phase bias due to the non-reciprocal nature of the Sagnac effect. Although it is possible to use the output signal of the photodetector to estimate the rotation directly, it is preferable to use a "nulling" or "zeroing" method and to estimate the rotation from a feedback modulation signal, in order to avoid linearity errors resulting from the intensity interference function. The idea is to generate a feedback modulation signal which introduces a non-reciprocal phase shift in the optical circuit which is equal in magnitude but opposite in sign to the rotationally-induced phase shift, thereby "nulling" or "zeroing" the variation of the intensity signal. Application of the feedback modulation signal to the phase modulator produces a phase difference between the counterpropagating waves which is continuously equal and opposite in sign compared to the phase shift induced by the rotation of the closed optical path. A method such as this in which there is a closed feedback loop is often referred to as a "closed-loop" method.

One method of closed-loop feedback, generally known as the "serrodyne method," makes use of a feedback modulation signal which is a reciprocal phase ramp having a slope proportional to $\phi_S/\tau_o$, where $\phi_S$ is a constant rotationally-induced phase shift and $\tau_o$ is the time taken for a light wave to travel around the closed light path of the interferometer in the absence of any rotation. A bias modulation signal consists of a voltage square-wave having an amplitude which induces a phase shift of plus or minus $\pi/2$ radians and a frequency equal to $\frac{1}{2}\tau_o$. Since the reciprocal phase ramp signal cannot increase indefinitely, the serrodyne method actually generates a sawtooth feedback waveform with a peak-to-peak amplitude of $2\pi$ radians, with the $2\pi$ phase transition effectively resetting the operating point of the interferometer to an equivalent position on the intensity interference curve relating output signal to input phase difference.

U.S. Pat. No. 4,705,399 to Graindorge et al, entitled "Device for Measuring a Non-reciprocal Phase Shift Produced in a Closed-Loop Interferometer," discloses a serrodyne phase modulation method in which a digital phase ramp in the form of a staircase-shaped voltage feedback signal is combined with a bias modulation signal of the type described above. The digital staircase signal consists of a sequence of voltage steps, each of duration $\tau_o$, to the phase modulator. In general, the amplitude of each step change is calculated to provide a non-reciprocal phase shift of plus or minus $\pi/2$ radians minus a Sagnac phase estimate. The intensity output of the interferometer is demodulated at the bias modulation frequency, namely $\frac{1}{2}\tau_o$.

The resulting signal is proportional to the residual Sagnac phase shift. It is this signal that a closed-loop controller will act to "null" or "zero." To avoid problems with voltage saturation, the modulation steps are occasionally required to "roll over" in the phase bias resetting operation described above. The step voltage to the phase modulator is adjusted to provide an additional phase shift of plus or minus $2\pi$ radians to keep the voltage to the phase modulator in a reasonable operating range. Additional demodulation logic may be employed during these roll-overs to determine the error in estimated phase modulator gain. Through subsequent roll-overs, the estimated phase modulator gain error may be nulled. The phase modulator gain is the proportionality constant relating the phase induced by the phase modulator in response to a given value of input voltage. This secondary loop control, as it is formally known, provides additional scale factor stability to the sensor. The scale factor for a closed-loop rotation sensing interferometer is proportional to the product of the Sagnac scale factor and the phase modulator gain. The Sagnac scale factor is the constant of proportionality between rate of rotation and the Sagnac phase shift.

Another phase modulation method which can be used is direct digital feedback, which is also a closed-loop method. Such a method is disclosed in U.S. patent application Ser. No. 031,323, entitled "Rotation Rate Nulling Servo and Method for Fiber-optic Rotation Sensor," by Jim Steele, filed Mar. 27, 1987, and assigned to the assignee of the present invention. The application by Steele is hereby incorporated by reference in the present application.

The Steele application discloses a direct digital feedback circuit which operates by alternately presetting the voltage drive on the phase modulator to zero and waiting for at least one transit time $\tau_o$ for the applied phase to go reciprocal, then switching the phase modulator voltage to a level corresponding to a non-reciprocal phase shift which is the difference between a reference ($-3\pi/2$, $-\pi/2$, $+\pi/2$, $+3\pi/2$ radians) and the Sagnac phase estimate. The resulting intensity signal is gated and observed for one transit time $\tau_o$ immediately following the setting of the reference voltage. The process is repeated in a predetermined sequence of reference levels and the results are processed to continuously develop a Sagnac phase estimate and a phase modulator gain estimate (secondary control) with which to adjust the amplitudes of the voltages to the phase modulator.

The major disadvantages of digital serrodyne methods are hardware complexity and cost in the case of short (less than 200 m) fiber length coils. The digital serrodyne method requires high effective processing rates ($1/\tau_o$ Hz) in order to generate the feedback terms, calculate roll-over, and drive the phase modulator. In addition, the use of shorter-length fiber coils begins to necessitate multiple D/A converters for modulation, since typical state-of-the-art D/A converters have inadequate settling times. Direct digital feedback may be implemented in short-length fiber coils in a hardware-efficient manner; however, the direct digital feedback method is susceptible to bias errors due to phase shifts in the detection circuitry and intensity modulation effects in the phase modulator.

SUMMARY OF THE INVENTION

A method and apparatus are disclosed for closed-loop phase modulation, intensity demodulation, control, and estimation of the non-reciprocal phase shift induced in a rotation sensing interferometer with a reciprocal phase modulator near one end of the closed light path. The method comprises generating a bias modulation signal, generating a feedback modulation signal, summing the bias modulation and feedback modulation signals to form a summed modulation signal, and applying the summed modulation signal to the phase modulation means in the closed optical path of the interferometer; demodulating the intensity interference signal; generating a Sagnac phase estimate signal; correcting for gain variation in the phase modulation means; and extracting the Sagnac phase estimate signal to provide an estimate of inertial rotation of the closed light path.

In accordance with the invention, apparatus for closed-loop phase modulation, intensity demodulation, and control of a Sagnac interferometer comprises means for producing a bias modulation signal, means for producing a feedback modulation signal, means for summing the bias modulation signal and the feedback modulation signal to produce a summed modulation signal, means for applying the summed modulation signal to the phase modulation means, means for demodulating the intensity interference signal, first servo means for generating a Sagnac phase estimate signal, second servo means for correcting for gain variation in the phase modulation means, and means for extracting the Sagnac phase estimate signal to provide an estimate of inertial rotation of the closed light path.

The bias modulation signal consists of a sequence of periodic step transitions between two or more signal levels. The duration of time spent on each signal level is designated $t_o$. For proper operation, the bias modulation step transition frequency, defined as $f_o=(t_o)^{-1}$, must not fall on even harmonics of the proper frequency, defined as $f_P=(2\tau_o)^{-1}$, where $\tau_o$ is the time required for light to travel once around the closed optical path of the interferometer. That is, $$f_o \neq 2Kf_P, \text{ where } K=0, 1, 2, \ldots$$

The voltage difference between any two adjacent levels will correspond to a phase difference of approximately $\pi/2$ radians. Transitions from one level to another introduce instantaneous non-reciprocal phase shifts at the photodetector of $-3\pi/2$, $-\pi/2$, $+\pi/2$, or $+3\pi/2$ radians.

The feedback modulation signal can consist of any periodic amplitude-modulated square wave with spectral components at harmonics of the bias modulation step transition frequency. The spectral power of the feedback modulation signal must be distributed across frequencies other than even harmonics of the proper frequency $f_P$. The feedback frequencies are given by $$f_{Fn}=nf_o, \text{ where } n=1, 2, 3, \ldots$$

BRIEF DESCRIPTION OF THE DRAWINGS

The various features and advantages of the present invention will become apparent in light of the following detailed description taken together with the accompanying drawings, in which:

FIG. 2 is a more detailed schematic block diagram of the phase modulation, intensity demodulation, and control apparatus shown in FIG. 1;

FIGS. 6a, 6b and 6c show a schematic diagram of an electrical circuit representing a possible analog embodiment of the reference signal source 78, the reference summing junction 80, the bias modulator 54, the feedback modulator 62, the reference summing junction 70, as well as the third and fourth signal modification means 86 and 100 diagrammed in FIG. 2;

FIG. 8a is a graph of a typical bias modulation signal; FIG. 8b is a graph of the non-reciprocal phase shift induced by the bias modulation signal of FIG. 8a; FIG. 8c is a graph of the feedback modulation signal; FIG. 8d is a graph of the non-reciprocal phase shift induced by the sum of the bias and modulation feedback signals shown in FIGS. 8a and 8c, respectively;

FIG. 9 is a graph of an example of alternative bias modulation waveform with a transition between two voltage levels;

FIG. 10 is a graph of three examples of an alternative bias modulation waveforms with transitions between four signal levels;

FIGS. 14 are graphs detailing timing aspects of the bias and feedback modulation waveforms of FIG. 8 for constant Sagnac phase; FIG. 14a is a graph of non-reciprocal phase shifts induced by Sagnac phase and bias modulation only, versus time; FIG. 14b is a graph of the intensity output resulting from the phase shifts of FIG. 14a; FIG. 14c is a graph of the Sagnac phase demodulation signal used to extract Sagnac phase information; FIG. 14d is a graph of non-reciprocal phase shifts with bias and feedback modulation.

FIGS. 16a through 16e are graphs detailing timing aspects of the bias modulation waveform of FIG. 8 for a positive bias modulation gain error; FIG. 16a is a graph of a bias modulation sequence with bias modulation gain error; FIG. 16b is a graph of non-reciprocal phase shifts induced by the bias modulation sequence of FIG. 16a with gain error; FIG. 16c is a graph of the intensity output resulting from the phase shifts of FIG. 16b; FIG. 16d is a graph of the demodulation signal which may be used to extract the bias modulation gain error; FIG. 16e is a graph of bias modulation corrected for phase modulator gain error by adjustment of the differences between the bias modulation signal levels using the gain error extracted from the demodulation signal of FIG. 16d.

DESCRIPTION OF THE PREFERRED EMBODIMENTS

Figure 1:
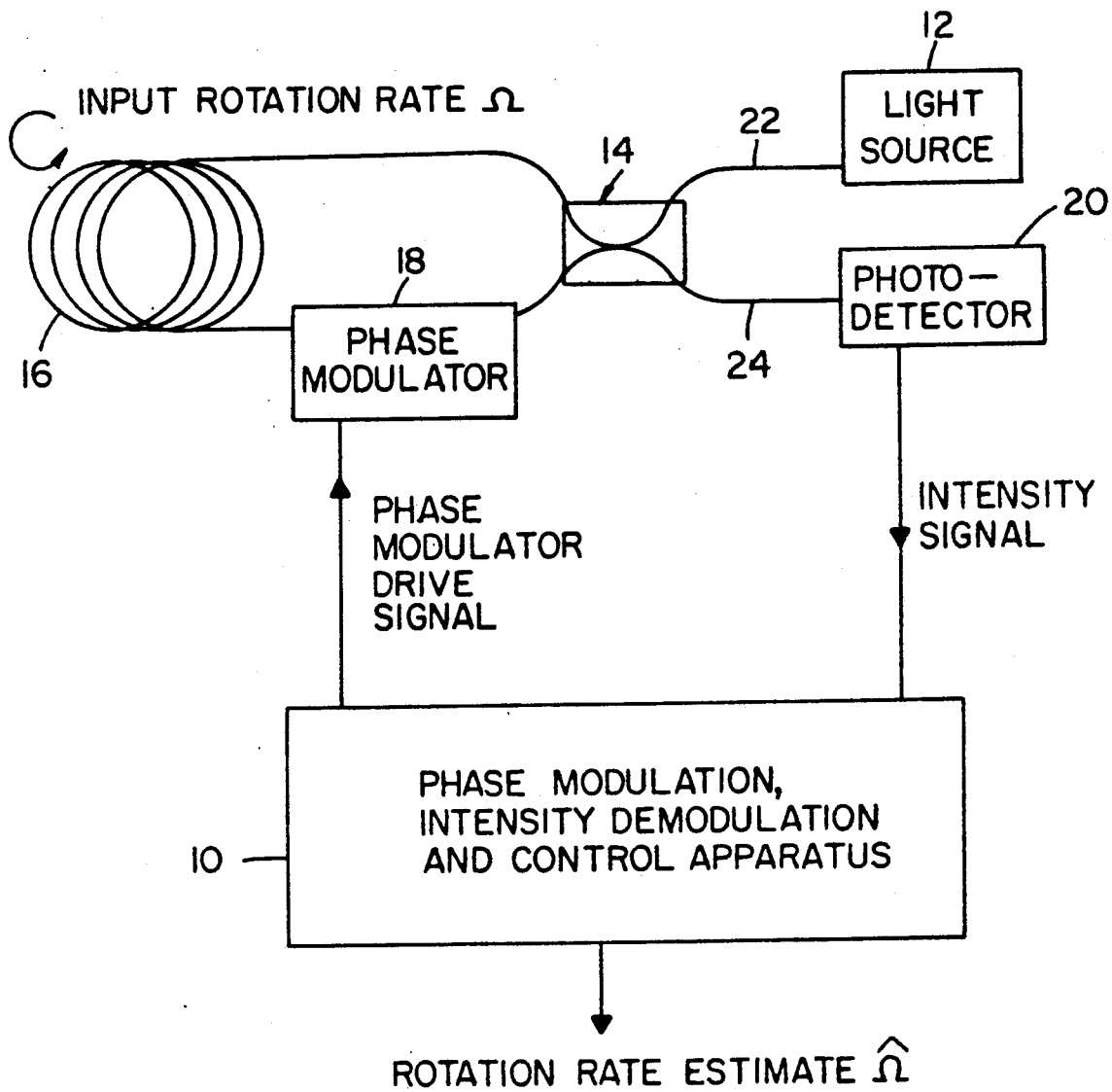
FIG. 1 is a schematic block diagram of the phase modulation, intensity demodulation, and control apparatus of the invention connected to an interferometric fiber-optic rotation-sensing interferometer.

FIG. 1 is a schematic block diagram of a phase modulation, intensity demodulation, and control apparatus 10 in accordance With the present invention. The invention provides a unique method of extracting the Sagnac phase information in a rotating fiber-optic coil with a reciprocal phase modulator placed in the optical circuit near one end of the sensing coil.

In FIG. 1 the apparatus 10 is shown operating in conjunction with a fiber-coil sensing arrangement which comprises a coherent light source 12, a 3-dB fiber-optic directional coupler 14, a multi-turn fiber-optic coil 16, a phase modulator 18 near one end of coil 16, a photodetector 20, and a preamplifier 21. Additional components such as a polarizer or second fiber-optic coupler may be employed in an actual sensing arrangement, but are omitted in the schematic illustration of FIG. 1.

The light output from coherent light source 12 travels along a length of optical fiber 22 to 3-dB directional fiber coupler 14. A second length of fiber 24 connects directional coupler 14 with photodetector 20. Optical power is introduced into one end of the fiber 22 from coherent source 12 and travels through the fiber until it is split by 3-dB coupler 14 and sent in Opposite directions around the closed path of fiber-optic multi-turn coil 16. One of the beams passes through the phase modulator 18 upon entering the coil and the other upon exiting. The beams recombine at coupler 14 and half of the optical power is routed to photodetector 20, where a beam interference pattern is electrically observed.

Referring to FIG. 2, which is a more detailed schematic block diagram of the phase-modulation, intensity demodulation, and control apparatus shown in FIG. 1, various functional component blocks may be seen. A first signal modification means 30 operates on a photodetector electrical signal 32 to produce a modified output signal which goes to first inputs 34 and 36 of a first demodulation means 38 and a second demodulation means 40, respectively. First demodulation means 38 extracts a phase servo error signal from its input signal and sends the phase servo error signal through a first output 42 to a first servo controller means 44. Second demodulation means 40 extracts a bias modulation gain servo error signal from its input signal and sends the phase modulator gain servo error signal through a first output 46 to a second servo controller means 48. First servo controller means 44 produces a phase estimate signal at an output 50. A phase modulation gain adjustment signal appears at an output 52 of second controller means 48.

A bias modulation means 54 for producing a bias modulation signal has a first input 56, a second input 58, and an output 60. A feedback modulation means 62 for producing a feedback modulation signal has a first input 64, a second input 66, and an output 68. A modulation summing junction means 70 sums a bias modulation signal on output 60 and a feedback modulation signal on output 68. A digital reference signal generation means 72 modulates feedback signal 64 and bias signal 56. A first demodulation reference signal is sent to second input 74 of first demodulation means 38 and a second demodulation reference signal to a second input 76 of the second demodulation means 40. A first modulation reference signal is sent to second input 58 of bias modulation means 54 and a second modulation reference signal is sent to second input 66 of feedback modulation means 62.

A reference signal source means 78 for producing a gain reference signal has an output connected to one input of a reference summing junction means 80. The output 52 of second servo controller means 48 is connected to a second input of reference summing junction means 80. A summed signal at an output 82 of reference summing junction means 80 is fed into input 56 of bias modulation means 54 and into a second signal modifying means 84.

First servo controller means 44 for input to feedback modulation means 62 has an input connected to output 42 of first demodulator means 38 and an output 50 connected to an input of a third signal modifying means 86. Second servo controller means 48 for input to bias modulation means 54 has an input connected to output 46 of second demodulator means 40 and an output 52 connected to reference summing junction means 80. An inverting means 87 inverts the output signal from second signal modifying means 84.

A phase modulator gain compensation means 88 for multiplying has first and second inputs 90 and 92 connected to outputs of inverting means 87 and third signal modifying means 86, respectively, and an output 94. The output signal at 94 is a measure of the rotation rate of the fiber coil 16 of the Sagnac interferometer to which phase modulation apparatus 10 is connected.

Modulation summing junction means 70 for summing first and second input signals sums output 60 of bias modulation means 54 and output 68 of feedback modulation means 62 to produce a summed modulation signal at an output 98. The summed modulation signal from modulation summing junction means 70 at output 98 is fed to a fourth signal modification means 100 for producing a modified summed modulation signal at an output 102 connected to an input of phase modulation means 18.

First signal modification means 30 may include means for amplifying, buffering, or analog-to-digital conversion of intensity interference electrical signal 32. Fourth signal modification means 100 may include means for amplifying, buffering, or digital-to-analog conversion of the summed modulation signal from output 102. Second signal modifying means 84 may include amplifying, filtering, and/or signal compensating means. Third signal modifying means 86 may also include amplifying, filtering, and/or signal compensating means. Signal compensation means might effect compensation of the signal for temperature, vibration, and/or other environmental conditions.

Reference summing junction means 80 and modulation summing junction means 70 may each comprise a summing amplifier, an analog equivalent of a summing amplifier, or may comprise digital electronic circuitry. First and second servo controller means 44 and 48 may comprise analog or digital electronics.

Digital reference signal generator means 72 may comprise a counter-sequenced memory. First demodulation means 38 and second demodulation means 40, which remove the phase servo error and bias modulation gain servo error, respectively, from a carrier signal may comprise analog switching demodulation electronics, such as a switched RC-storage network, or the digital electronic equivalent thereof.

Bias modulation means 54 may comprise chopper circuitry or any analog equivalent providing multistate voltage transitions, or may be implemented digitally. Feedback modulation means 68 may comprise chopper circuitry or any analog equivalent providing an amplitude-modulated voltage square wave, or may be implemented in digital circuitry.

Figure 3A:
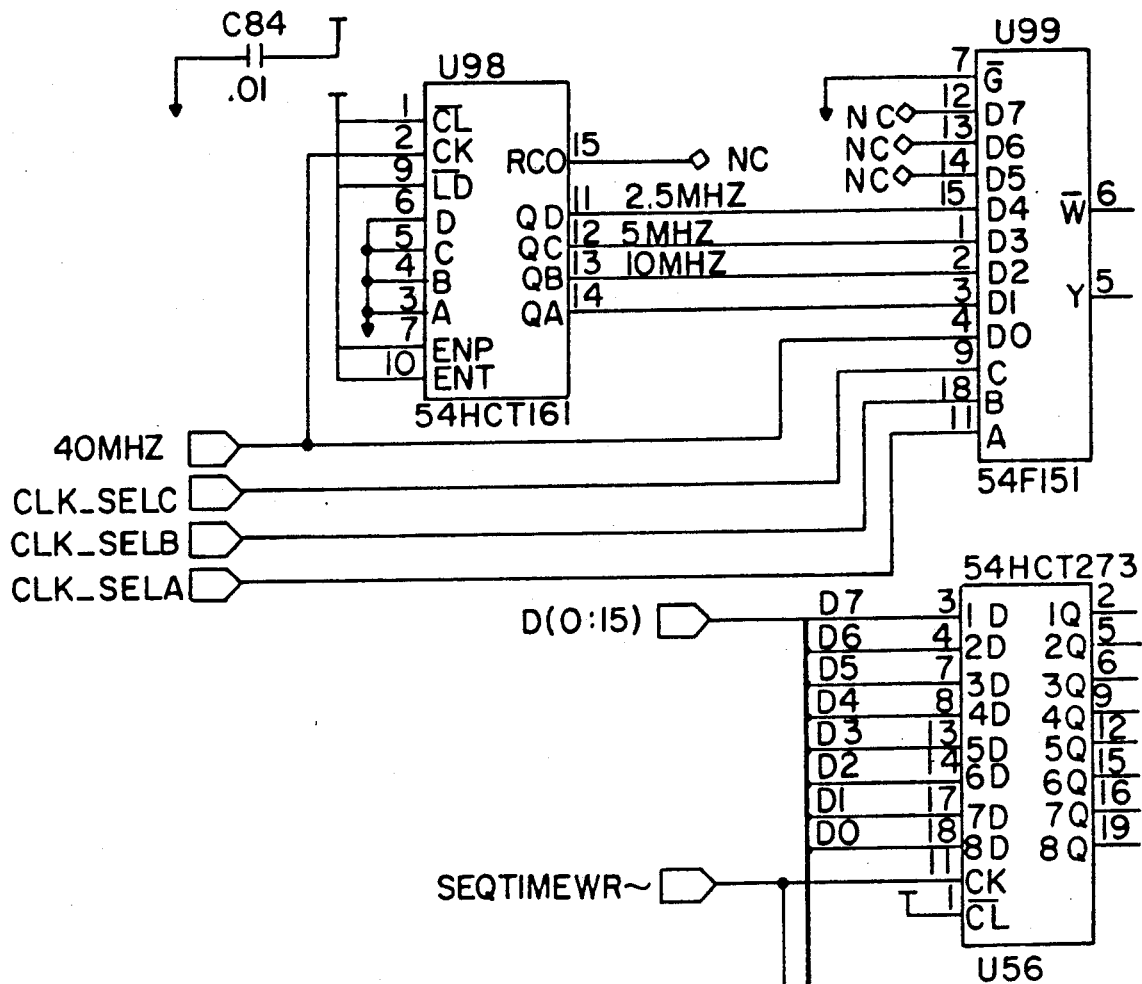
FIGS. 3a, 3b and 3c show a schematic diagram of a first portion of an electrical circuit representing one possible embodiment of the digital reference signal generator 72 diagrammed in FIG. 2; h
Figure 3B:
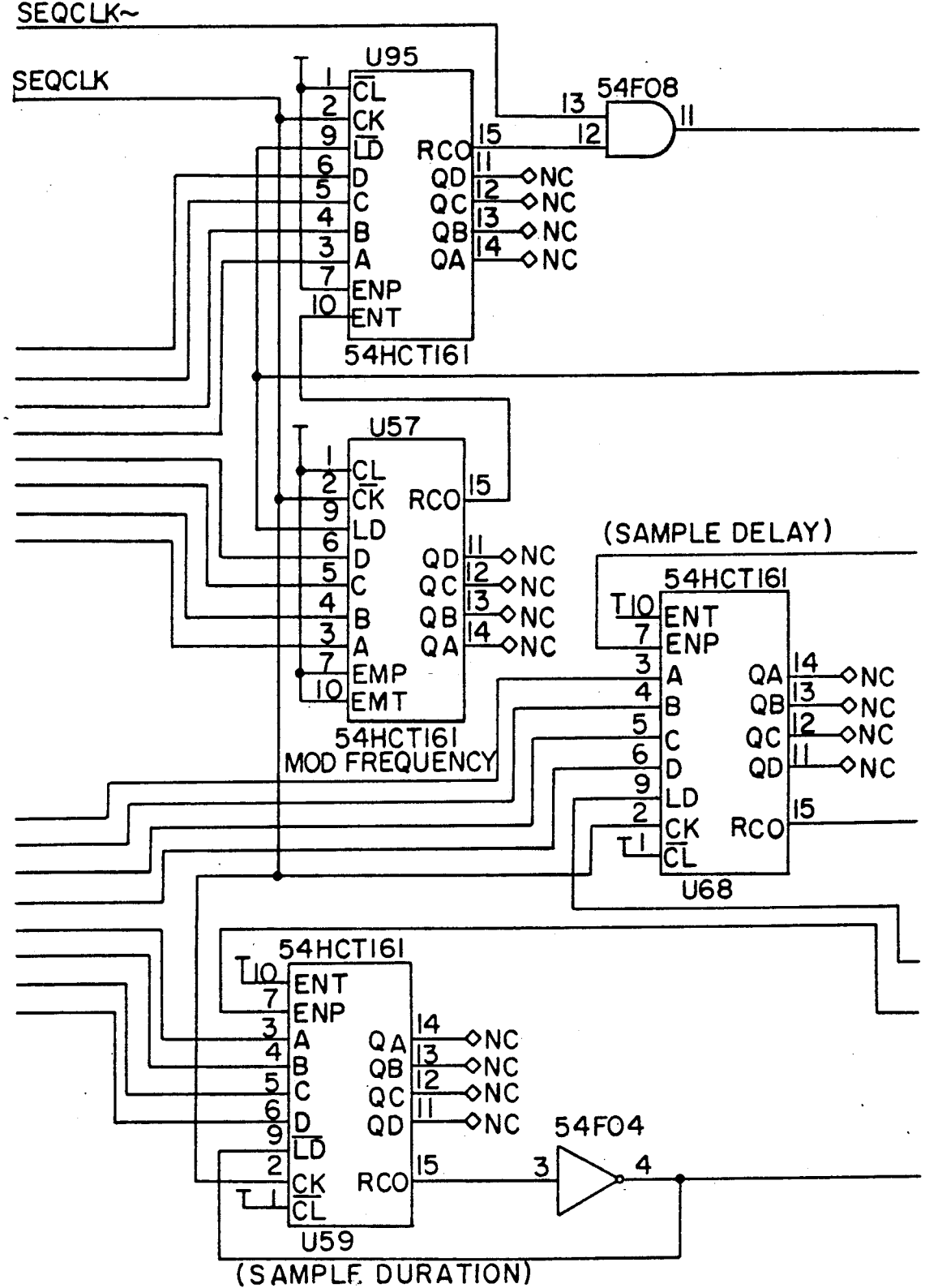
Figure 3C:
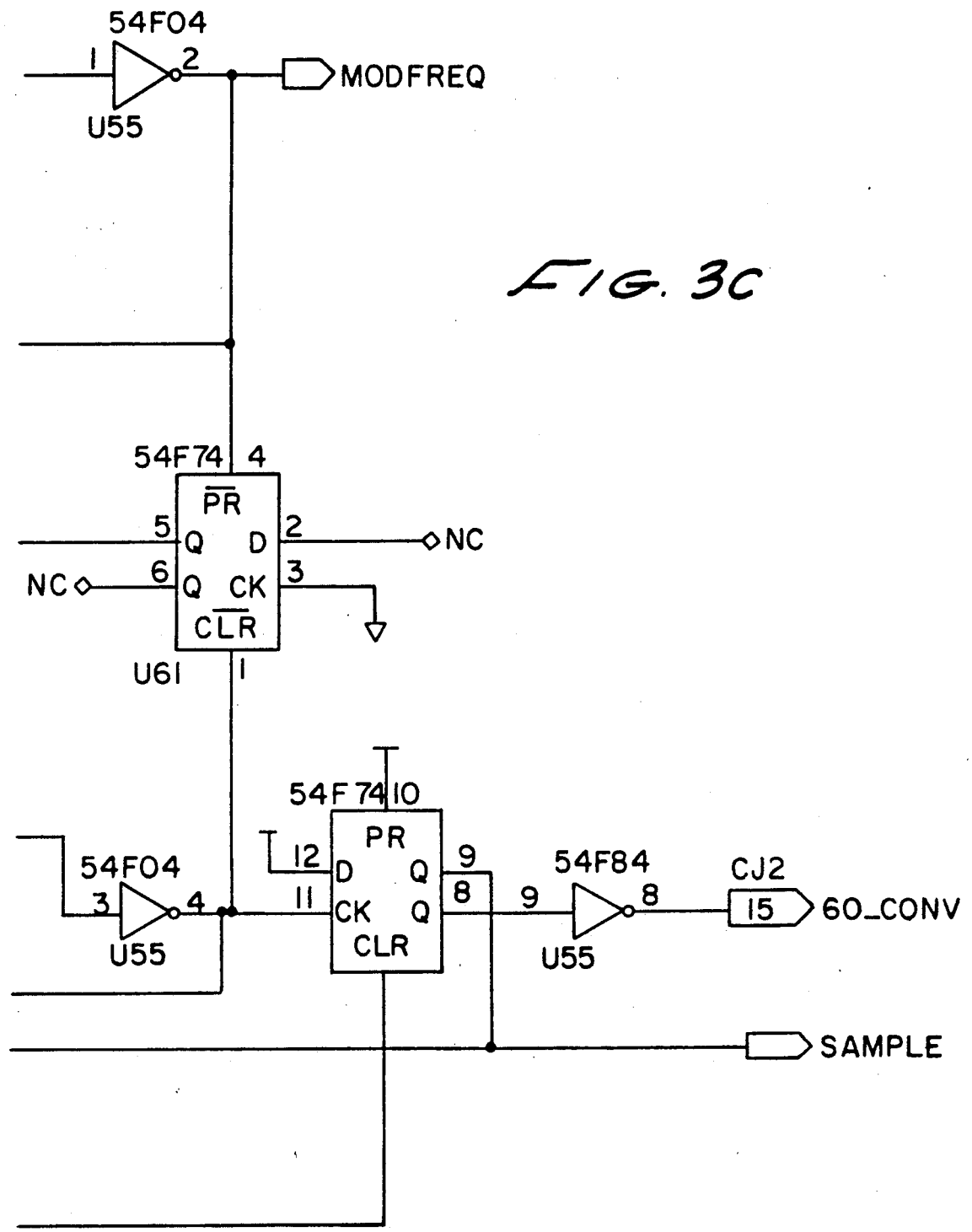
Figure 4A:
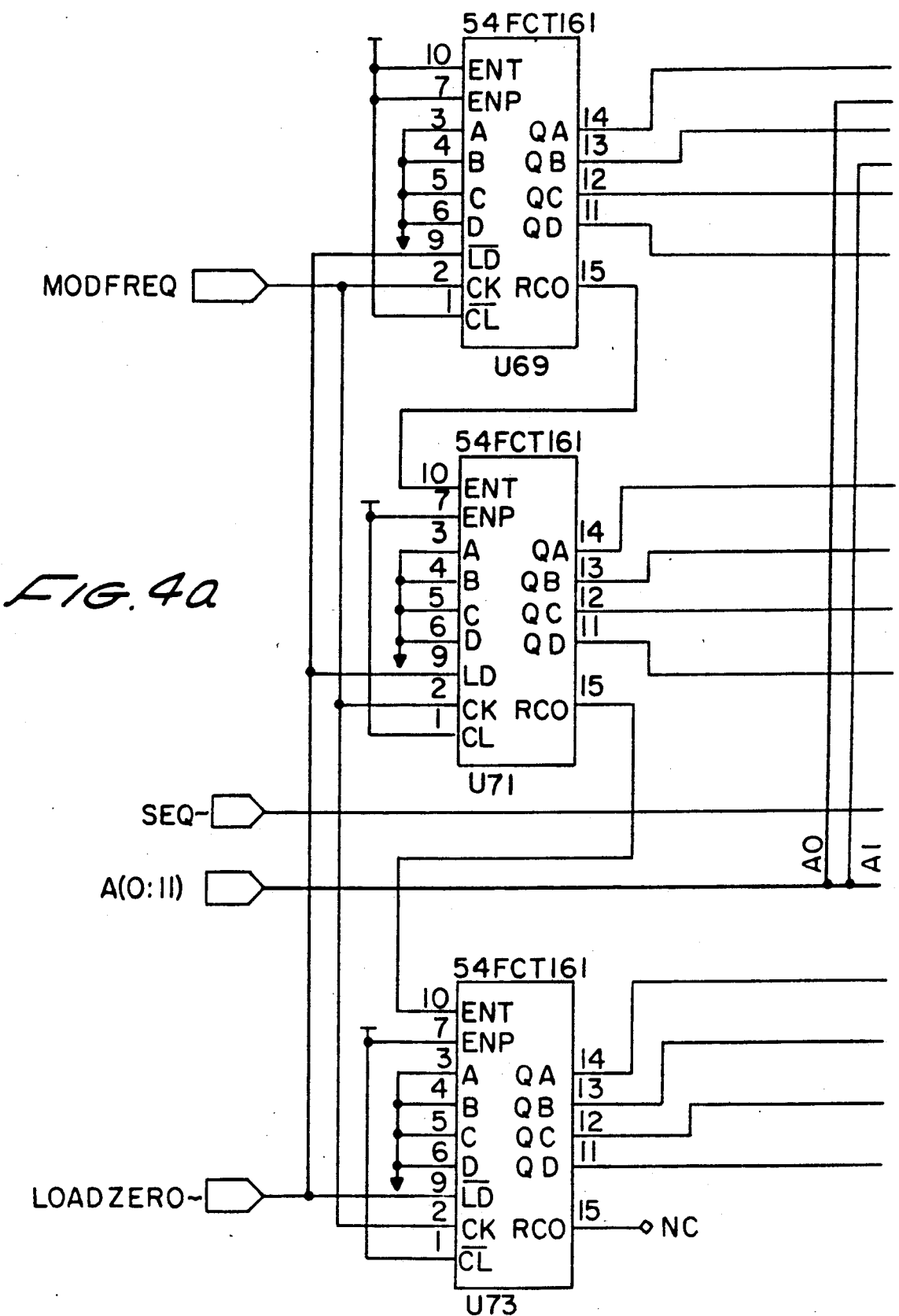
FIGS. 4a and 4b show a schematic diagram of a second portion of an electrical circuit representing one possible embodiment of the digital reference signal generator 72 diagrammed in FIG. 2.
Figure 4B:
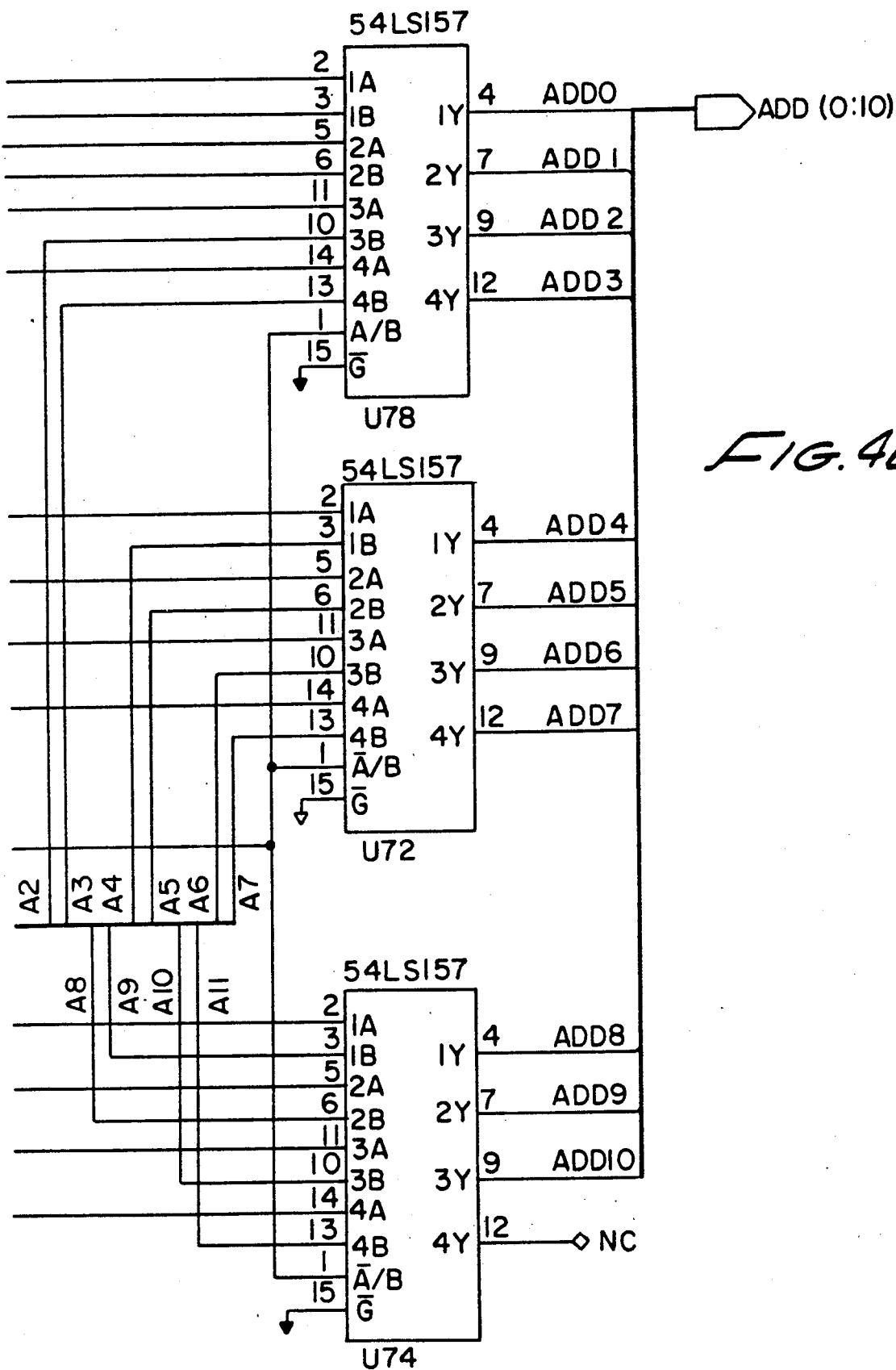
Figure 5A:
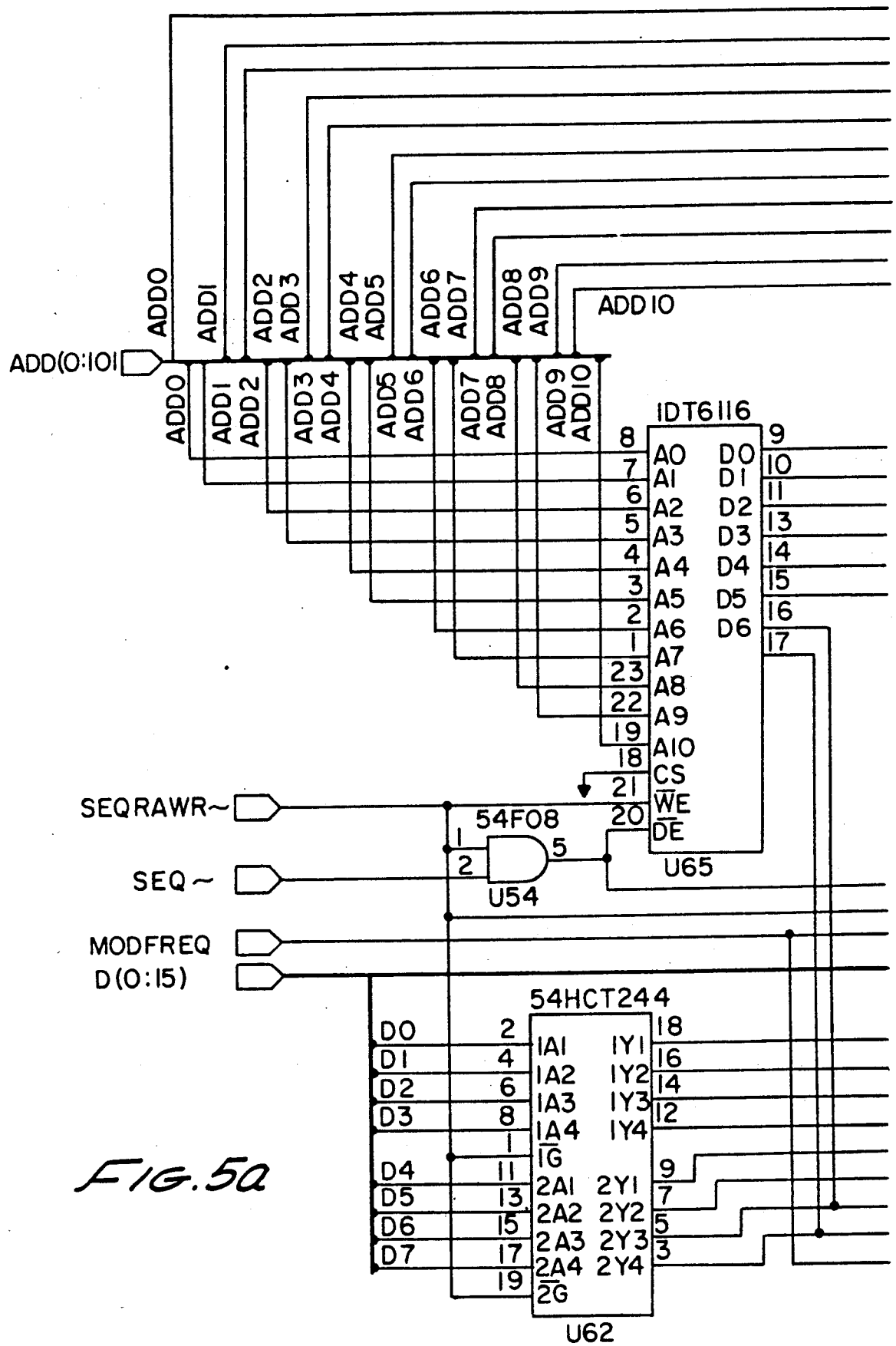
FIGS. 5a, 5b and 5c show a schematic diagram of a third portion of an electrical circuit representing one possible embodiment of the digital reference signal generator 72 diagrammed in FIG. 2.
Figure 5B:
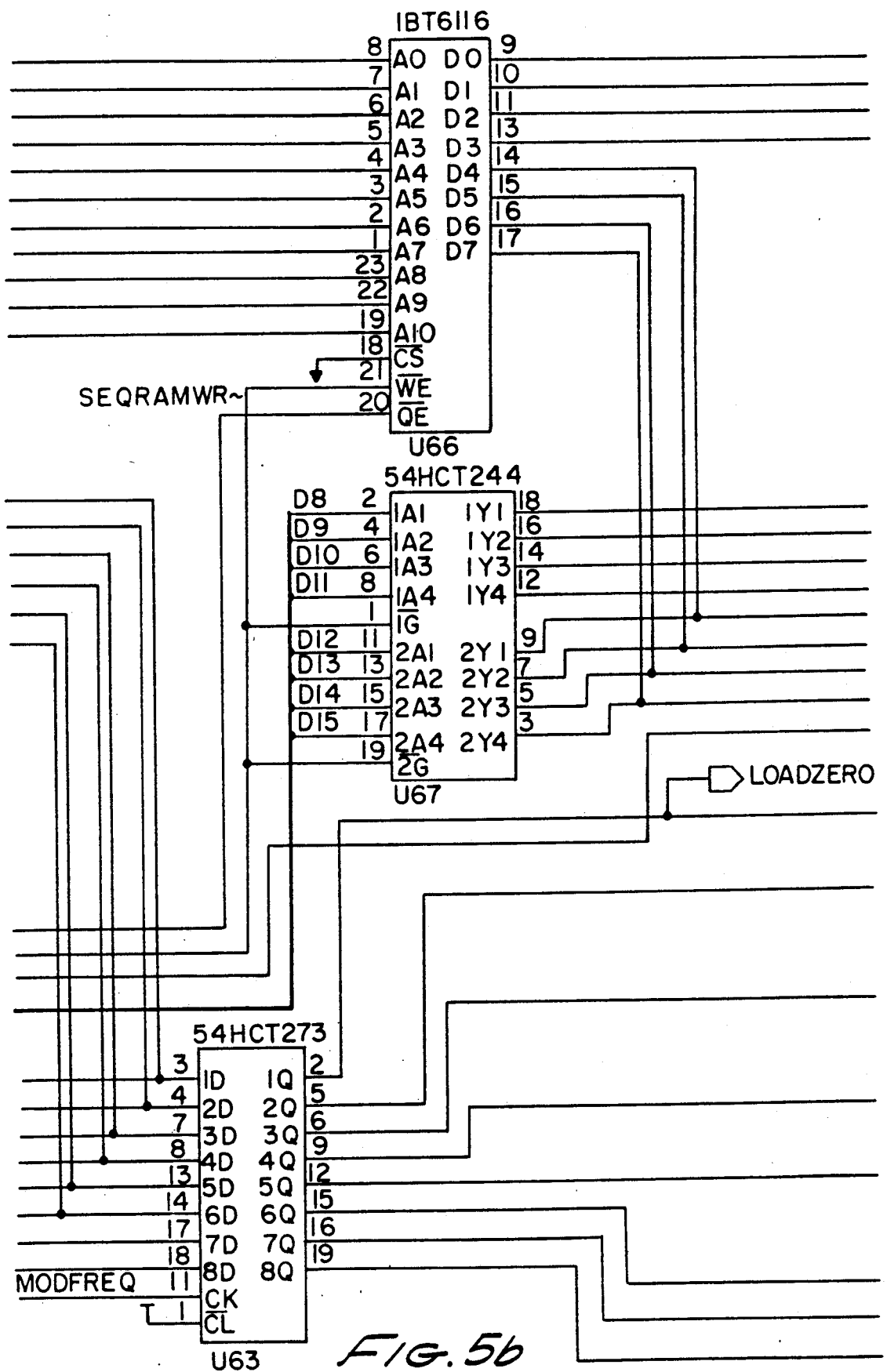
Figure 5C:
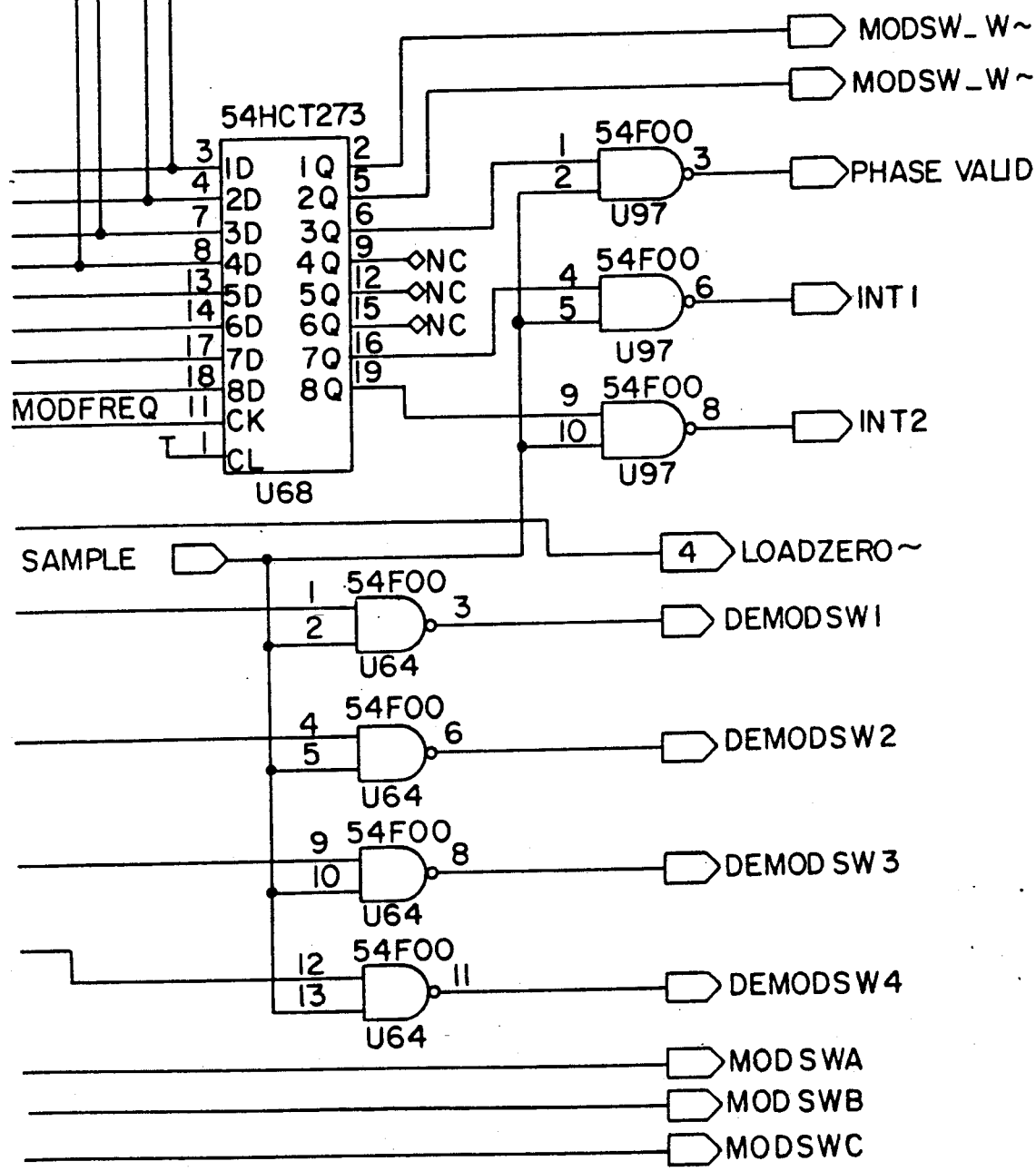

FIGS. 3, 4, and 5 are schematic diagrams of first, second, and third portions of an electrical circuit representing one possible embodiment of the digital reference signal generator 72 diagrammed in FIG. 2. The function of the digital reference signal generator 72 is to provide the timing and test patterns for bias and feedback modulation and primary and secondary loop switching command.

Implementation and Operation

One of the practical advantages that ensues from the modulation method of the invention is that the four signal levels encompassing the bias modulation waveform, the square-wave feedback waveform, and the demodulation switching may be readily implemented using a few analog switches and a digital reference signal generator 72. The bias modulation waveform, for example, can be easily constructed from the outputs of three switches referenced to the same voltage level; the feedback modulation is easily constructed by using a switch to chop the DC feedback term. The control loops may be closed in either an analog or a digital fashion.

Reference Signal Generator

A counter sequenced memory may be used to develop all switching signals for generation of the bias modulation, feedback modulation, intensity gating, and demodulation signals. The bias modulation may be developed by simultaneously switching in and out combinations of three equivalent precision electrical currents at intervals of $2\tau_o$. Since the currents are not necessarily identical, the counter sequenced memory could be programmed to commutate the currents through all their permutations for the bias modulation waveform. The feedback modulation would be developed by switching the feedback voltage in and out at intervals of $\tau_o$.

Modulation

The phase modulation method of the invention is a closed-loop method which employs a periodic bias modulation signal of predetermined shape and an amplitude-modulated square-wave feedback modulation signal which are summed prior to being applied to the phase modulator. FIG. 8a shows a typical bias modulation signal waveform. The non-reciprocal phase shift induced by the bias modulation of FIG. 8a is shown in FIG. 8b. FIG. 8c shows the feedback modulation signal waveform. The non-reciprocal phase shift induced by the sum of the bias and modulation feedback signals shown in FIGS. 8a and 8c, respectively, is shown in FIG. 8d.

The bias modulation signal consists of a series of step voltage levels, each with a duration of preferably $2\tau_o$. This series of step levels can, for example, assume any one of four voltage values. The voltage difference between any two adjacent levels will correspond to a phase difference of roughly $\pi/2$ radians. Transitions from level to level introduce instantaneous non-reciprocal phase shifts at the photodetector of $-3\pi/2$, $-\pi/2$, $+\pi/2$, or $+3\pi/2$ radians.

Additional constraints on the modulation sequence may be exercised. Transitions between levels which introduce phase shifts of plus or minus $\pi$ radians may be avoided in order to desensitize the demodulation processing to phase shifts in the detection circuitry.

FIG. 9 is a graph of an example of a bias modulation waveform with a transition between two signal levels. Many variations of the bias modulation waveform may be achieved when there are several levels. For example, three different four-level bias modulation waveforms are displayed in FIG. 10. A given bias modulation waveform may be inverted to produce an acceptable variation. Also, other variations may be generated by the repetition of certain cycles of transition from level to level, as shown in FIG. 10.

The feedback modulation is an amplitude-modulated square wave with amplitude proportional to the Sagnac phase estimate. The period of this feedback modulation square wave is equal to the duration of the bias modulation step; the leading edge of the feedback square wave will always correspond to the bias modulation level transition.

Gating and Demodulation

Demodulation may be realized by detection and processing of the intensity signal for each transit time $\tau_o$ immediately following a bias modulation signal level transition. After the transit time $\tau_o$ has elapsed, the phase at the photodetector goes reciprocal. The intensity signal should be gated out during this time. In general, the primary loop demodulation is given by the following combination of intensities:

$$\bar{\phi}_S \propto [(I_2+I_4)-(I_1+I_3)]$$

where $\propto$ = is proportional to
$\phi_S$ = Sagnac phase estimation error;
$I_1$ = intensity measurement at operating point #1 (phase bias = $-3\pi/2$ radians);
$I_2$ = intensity measurement at operating point #2 (phase bias = $-\pi/2$ radians);
$I_3$ = intensity measurement at operating point #3 (phase bias = $\pi/2$ radians); and
$I_4$ = intensity measurement at operating point #4 (phase bias = $3\pi/2$ radians).

Figure 13A:
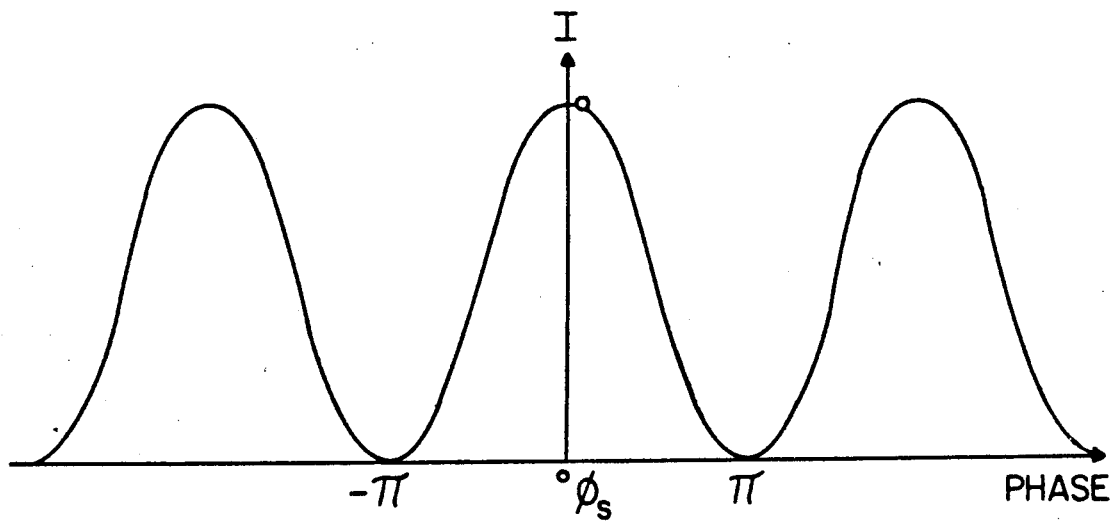
FIG. 13a is a graph of the interferometric transfer function for a small positive constant Sagnac phase and open-loop operation with no modulation.
Figure 13B:
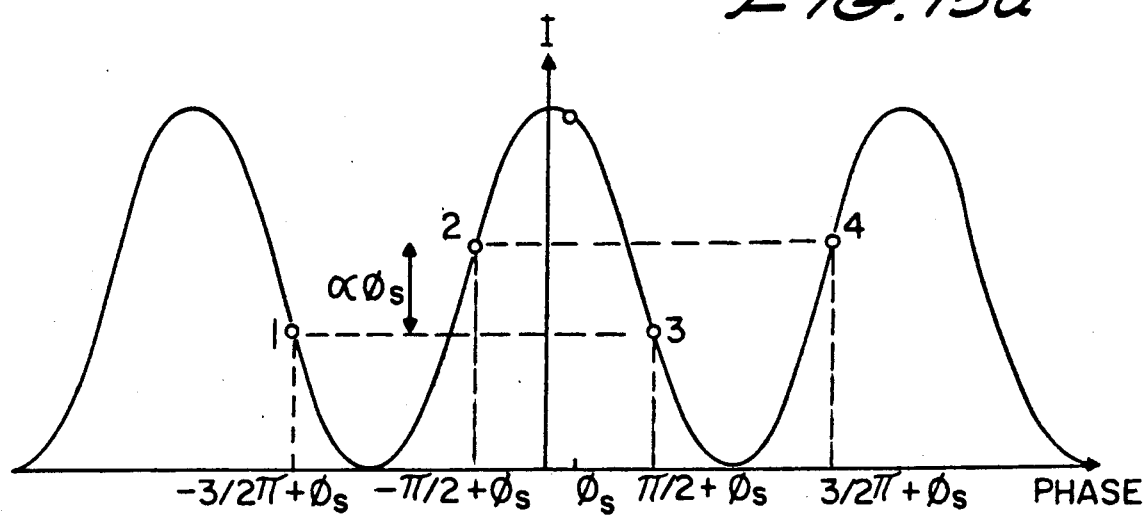
FIG. 13b is a graph of the interferometric transfer function for the same Sagnac phase and open-loop operation with bias modulation only.
Figure 13C:
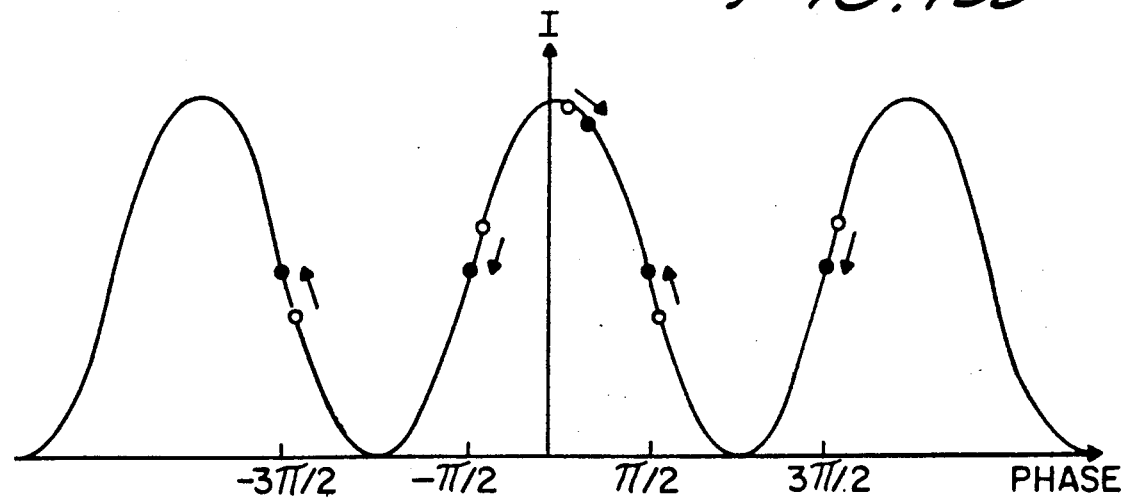
FIG. 13c is a graph showing that bias and feedback modulation cause the open-loop intensity operating points to shift; the intensity operating points in FIGS. 13a–c are designated by small open circles; feedback modulation causes the intensity operating points to shift to those designated by closed circles.

FIG. 13a illustrates the interferometric transfer function for a small positive constant Sagnac phase and open-loop operation with no modulation. FIG. 13b shows the same interferometric transfer function with bias modulation only. The intensity operating points are designated by small open circles. In FIG. 13c the open-loop intensity operating points are seen to shift as a result of bias and feedback modulation.

The detailed timing aspects of the bias and feedback modulation waveforms of FIG. 8 for constant Sagnac phase are illustrated in FIGS. 14a through 14d. FIG. 14a shows the non-reciprocal phase shifts induced by Sagnac phase and bias modulation only, versus time. FIG. 14b shows the intensity output resulting from the phase shifts of FIG. 14a. FIG. 14c shows the Sagnac phase demodulation signal used to extract Sagnac phase information. FIG. 14d is a graph of non-reciprocal phase shifts with bias and feedback modulation.

In general, the secondary loop demodulation is given by the following combination of intensities:

$$\bar{\delta}g \propto [(I_1+I_4)-(I_2+I_3)]$$

where $\bar{\delta}g$ = bias modulation gain error.

Figure 15A:
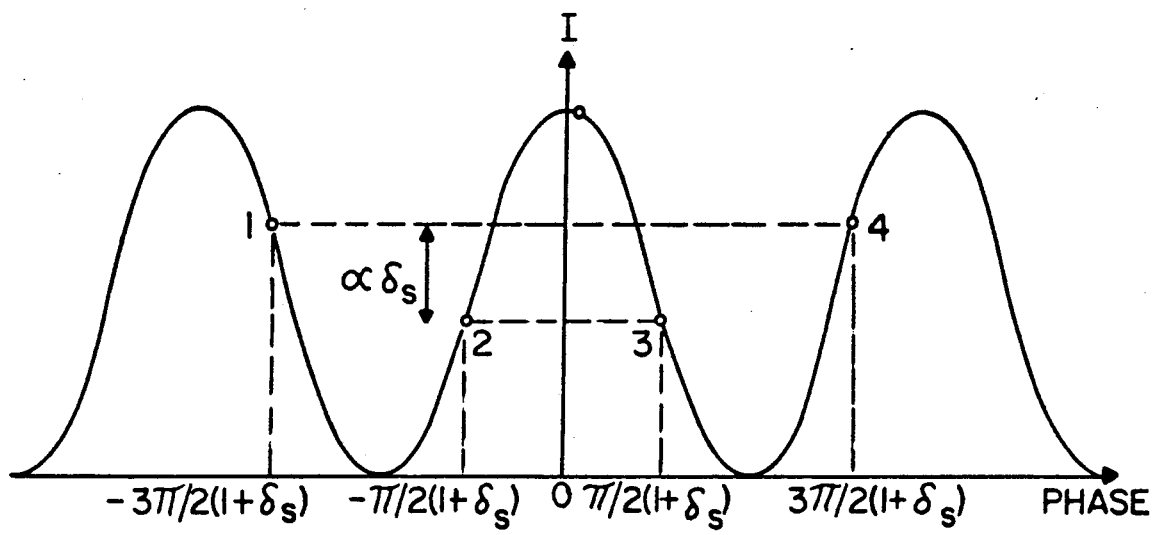
FIG. 15a is a graph of the interferometric transfer function showing the intensity operating points (designated by small open circles) for a nulled Sagnac phase and positive bias modulation gain error.
Figure 15B:
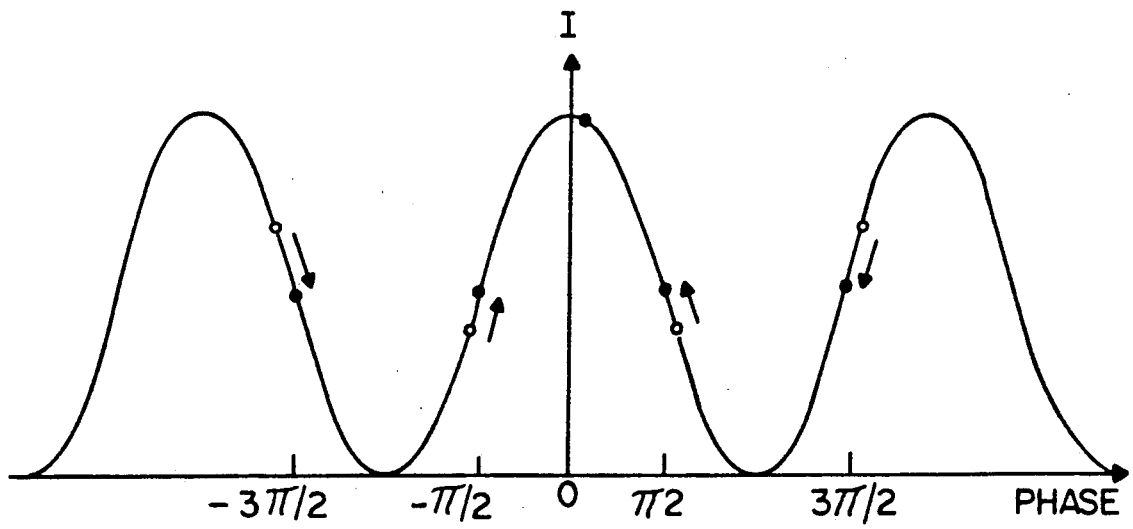
FIG. 15b is a graph of the interferometric transfer function showing that correction of the bias modulation error will cause the intensity operating points to shift.

FIG. 15a illustrates the interferometric transfer function with the intensity operating points designated by small open circles, for a nulled Sagnac phase and a positive bias modulation gain error. Correction of the bias modulation error will cause the intensity operating points to shift, as shown in FIG. 15b.

The detailed timing aspects of the bias modulation waveform of FIG. 8 for a positive bias modulation gain error are illustrated by FIGS. 16a through 16e. FIG. 16a depicts a bias modulation sequence with bias modulation gain error. FIG. 16b illustrates the non-reciprocal phase shifts induced by the bias modulation sequence of FIG. 16a with gain error. FIG. 16c shows the intensity output resulting from the phase shifts of FIG. 16b. FIG. 16d shows the demodulation signal which may be used to extract the bias modulation gain error. FIG. 16e depicts bias modulation corrected for phase modulator gain error by adjustment of the differences between the bias modulation signal levels using the gain error extracted from the demodulation signal of FIG. 16d.

In an analog embodiment, the sequencer would drive a set of demodulation switches which feed the intensity signals onto one of four RC networks. The first pair of RC networks would be used to differentially drive an operational amplifier whose output is proportional to residual Sagnac phase error. The other pair of RC networks would be used to differentially drive an amplifier whose output is proportional to residual bias modulation gain error.

Feedback

The function of the servo controllers is to produce a feedback signal which will drive the input to the servo controller to zero. In practice, the servo controllers may consist of varied combinations of proportional and integral gain. In the analog embodiment, the primary and secondary control loop servo controllers are each implemented with single integrators, thereby forming "type 1" servos. The residual Sagnac phase error drives an integrator and the output is fed back to the modulation circuitry. (In practice, a differential amplifier and an integrator may be combined into a single device). Under normal operation, the closed loop will act to null the input to the integrator (primary loop control) and the output of the integrator becomes proportional to the Sagnac phase estimate. The residual bias modulation gain error is similarly integrated by an integrator, and fed back to the modulation circuitry to adjust the reference signal for bias modulation (secondary loop control). The reference signal for bias modulation as implemented in the analog embodiment represents the voltage step required to produce a $\pi/2$ non-reciprocal phase shift. To relate the feedback signal (voltage) to feedback phase shift, the reference signal for bias modulation must be inverted to give a measure of the non-reciprocal phase shift produced by a step voltage change (phase modulation gain) and then multiplied by the feedback signal (voltage) to produce an estimate of feedback phase shift.

Ideally, the voltage (step) required to produce a $\pi/2$ non-reciprocal phase shift is constant. Since the inverse of this signal would also be constant, the feedback phase shift would be proportional to the feedback signal (voltage).

As a practical matter, the voltage step required to produce a $\pi/2$ non-reciprocal phase shift will vary slightly with time and environment. The estimate of feedback phase required to null the Sagnac phase will vary accordingly with the inverse of this factor.

Since the inertial rate estimate is proportional to feedback phase, the action of the secondary loop may be viewed as a scale factor stabilization of the apparatus.

An important variation of the analog embodiment from the block diagram of FIG. 2 is that the secondary control loop feedback signal is sampled before the summation junction 80 where the reference bias modulation gain is summed with the second servo controller output 52. This allows a more precise measurement of the bias modulation gain estimate, since the bias modulation reference gain is known by design and since all perturbations in the bias modulation gain estimate are reflected in the output of the second servo 48. To form the bias modulation gain estimate in this instance, the second servo output 52 is summed with a software version of the bias modulation reference gain. Compensation of the feedback signal for phase modulation gain variations is otherwise the same as explained above.

Sensor Output

The voltage at the output of the primary loop servo in an analog implementation may be buffered by an amplifier, and output as a simple analog output, or prefiltered by a filter, and sampled via a quantizer or A/D converter if a digital output was desired. The voltage at the output of the secondary loop may be prefiltered by a second filter, and sampled by an A/D converter to correct scale factor digitally, or may otherwise be used to correct scale factor error in first output voltage in an analog fashion.

Bias Modulation Step Transition Frequency Alternatives

The modulation comprises application of a bias modulation signal and a feedback modulation signal. The bias modulation consists of a predetermined sequence of periodic step signal transitions between two or more signal levels. The duration of time spent at each signal level is designated $t_o$. A bias modulation step transition frequency $f_o$ is defined as $f_o = (2t_o)^{-1}$.

FIG. 9 shows an example of a bias modulation waveform for transitions between two signal levels. FIG. 10 shows three examples of bias modulation waveforms for transitions between four signal levels. In general, two to four signal levels will be the preferred configuration, since the complexity of the system will increase accordingly for larger numbers.

An additional constraint on the bias modulation arises from the non-reciprocal phase shift/signal input transfer characteristic of the phase modulator. For proper operation, the bias modulation step transition frequency $f_o$ must not fall on even harmonics of the proper frequency $f_P$. That is, $$f_o \neq 2kf_P, \text{ where } k=0, 1, 2, \ldots$$

A detailed explanation is as follows:

The non-reciprocal phase output/signal frequency input transfer function $G(w)$ of a reciprocal phase modulator placed near one end of an optical circuit may be modelled as $$G(w) = K_C(1 - Z^{-1})$$

where $Z = \exp(s\tau_o)$, $\tau_o =$ fiber transit time, and $K_C =$ phase modulator gain. Then, $$\begin{aligned} G(w) &= Z^{-\frac{1}{2}}(Z^{\frac{1}{2}} - Z^{-\frac{1}{2}}) \\ &= K_C \exp(-jw\tau_o/2)[\exp(jw\tau_o/2) - \exp(-jw\tau_o/2)] \\ &= K_C \exp(-jw\tau_o/2)[2j \sin(w\tau_o/2)] \end{aligned}$$

$$|G(w)| = 2K_C \sin(w\tau_o/2)$$

The gyro proper frequency $f_P$ is defined as $\frac{1}{2}\tau_o$. In terms of $w$:

$$W_P = 2\pi f_P$$

$$W_P = \pi/\tau_o$$

$$G(w) = 2K_C \sin[(\frac{1}{2})\pi(W/W_P)]$$

Figure 11:
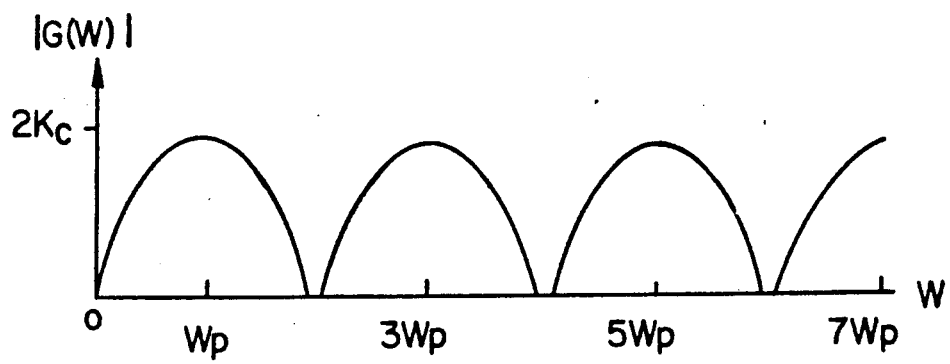
FIG. 11 is a graph of the magnitude of the transfer function (non-reciprocal phase output against signal frequency input) for a reciprocal phase modulator placed near one end of a closed optical path in a rotation-sensing interferometer.

The magnitude of this transfer function is shown in FIG. 11, where it can be seen that the transfer function has zero gain at even harmonics of the proper frequency. With the modulation method of the present invention, the bias and feedback signals must avoid these frequencies.

Since the feedback harmonics will always fall on even harmonics of the bias modulation step transition frequency, then, the bias modulation step transition frequency should not fall on any even harmonic of the proper frequency.

The feedback frequencies are given by $$f_{Fn} = nf_o, \text{ where } n=1, 2, 3, \ldots$$

Figure 12A:
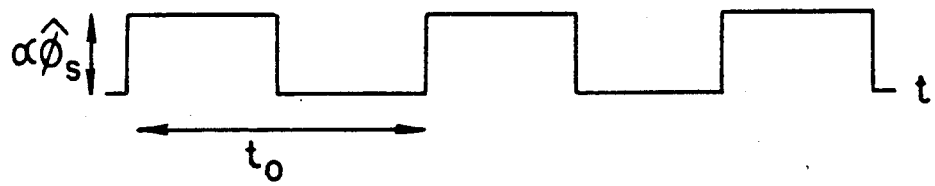
FIG. 12a is a graph of a preferred feedback modulation waveform.
Figure 12B:
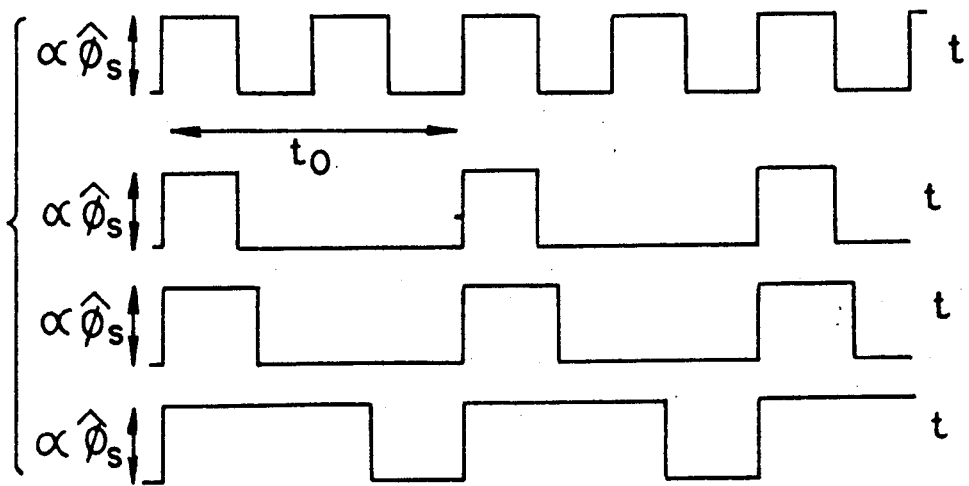
FIG. 12b is a graph of four acceptable alternative feedback modulation waveforms.

In FIGS. 12a and 12b some examples of feedback waveforms are shown which meet the requirements of this definition. The waveform shown is FIG. 12a is the preferred waveform; the waveforms shown in FIG. 12b are acceptable alternatives.

The following section describes in functional terms an implementation of the phase modulation method with analog loop closure.

Digital Reference Signal Generator Circuit Description

This assembly consists of a 2K×16 RAM and an 11-bit address register/counter which is used to store and sequence the test patterns.

The bias modulation step frequency, as dictated by the length of fiber in the gyro, is configured by presetting an 8-bit free-running counter and reloading with the preset value on the counter overflow.

The range of modulation frequency is from CLK/2 to CLK/256, where CLK is the frequency of the input clock to the digital reference signal generator 72. The clock frequency in the present embodiment is 20 MHz.

The sampling of the results of the modulation is accomplished by presetting a 4-bit clock-controlled counter and reloading with the present value on overflow. The duration of the sample period is between 1/CLK and 16/CLK. During the sample period, selected switches in the analog circuitry are closed, allowing the demodulated signal to be routed to a low-pass filter network. The start of the sample can be delayed from the start of the modulation by the sample delay counter. The sample delay counter is a 4-bit clock-controlled counter which is preset and then reloaded with the present value on the counter overflow. The duration of the delay is greater than 1/CLK and less than 16/CLK.

Operation of Digital Reference Signal Generator

Initialization of the digital reference signal generator 72 is performed at "power on." A microprocessor loads timing values for the bias modulation step frequency in an 8-bit latch (U56) and sample and delay times in an 8-bit latch (U58).

The microprocessor loads the RAM (U65 and U66) with the test patterns. Addresses for RAM are routed through digital MUXs (U70, U72 and U74) and data for the RAM are routed through octal buffers (U62 and U67).

Upon completion SEQ* is set low and the digital reference signal generator 72 becomes operational.

Digital Reference Signal Generator Timing Generation

Modulation frequency counters (U57 and U95) start counting up. On overflow, a signal (MODFREQ) is generated. MODFREQ reloads the bias modulation step frequency counter and sets the count enable latch (U61) for the sample delay counter. When the sample delay counter overflows, it reloads itself with the preset value, resets its count enable latch, and sets the count enable for the sample counter forming the signal SAMPLE. When the sample counter overflows, it reloads itself and resets the count enable latch making SAMPLE a logic low. This completes a single cycle of the free-running sequencer timing generation.

Pattern Generation

The RAM (U65 and U66) which contains the test pattern is addressed by address counters (U69, U71 and U73) via MUXs (U70, U72 and U74). The address counter is incremented when signal MODFREQ is generated.

The contents of the RAM are loaded into the deskewing latches U63 and U68. Four outputs of the deskewing latches are ANDed with sample and then routed to the demodulation circuit of the analog board. Four of the deskewing latch outputs are routed to the modulation circuit of the analog board. Three of these control the bias modulation switches and the fourth controls the feedback modulation. One output of the deskewing latch is routed back to the address counters to load and restart a new cycle.

Figure 6B:
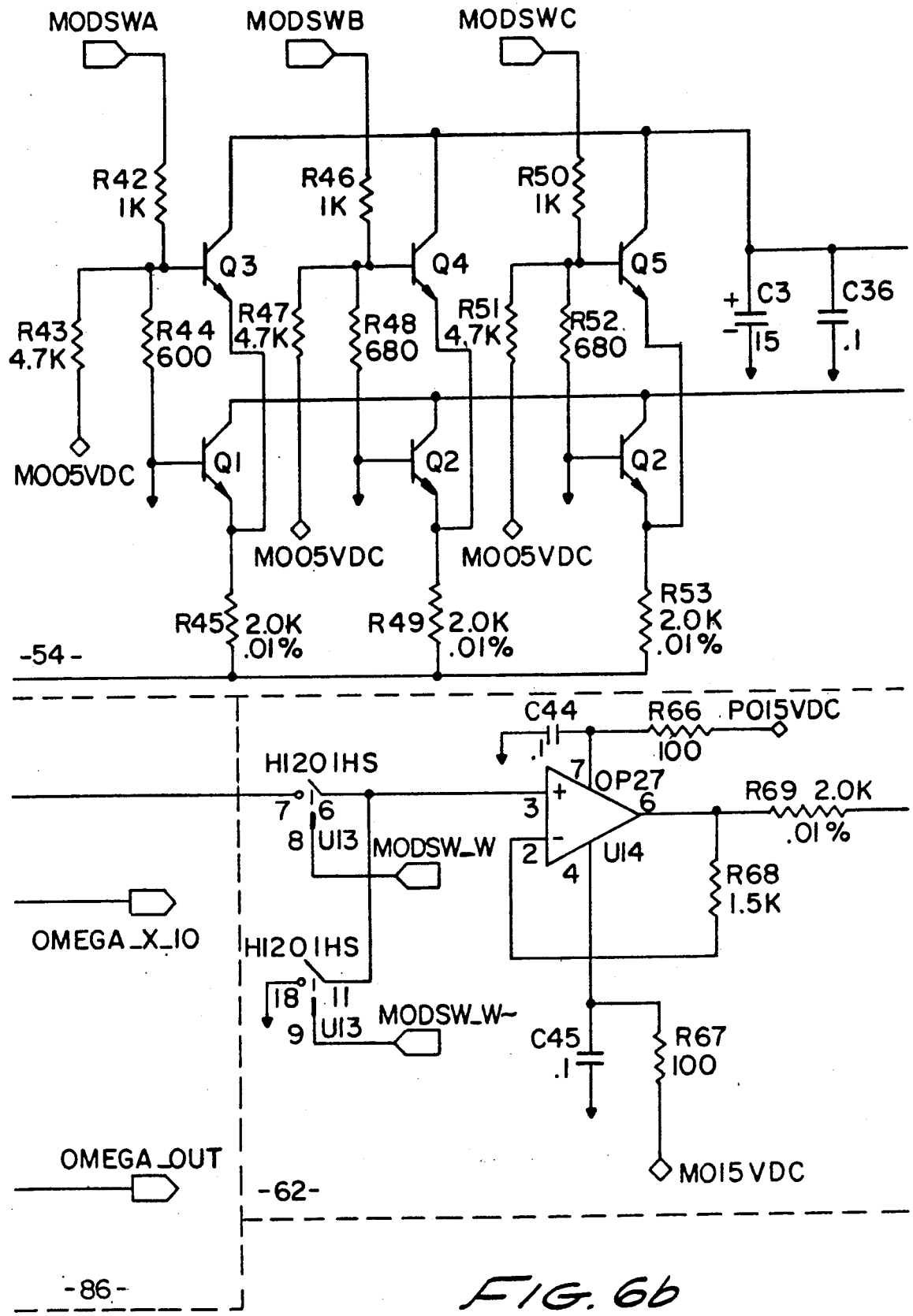
Figure 6C:
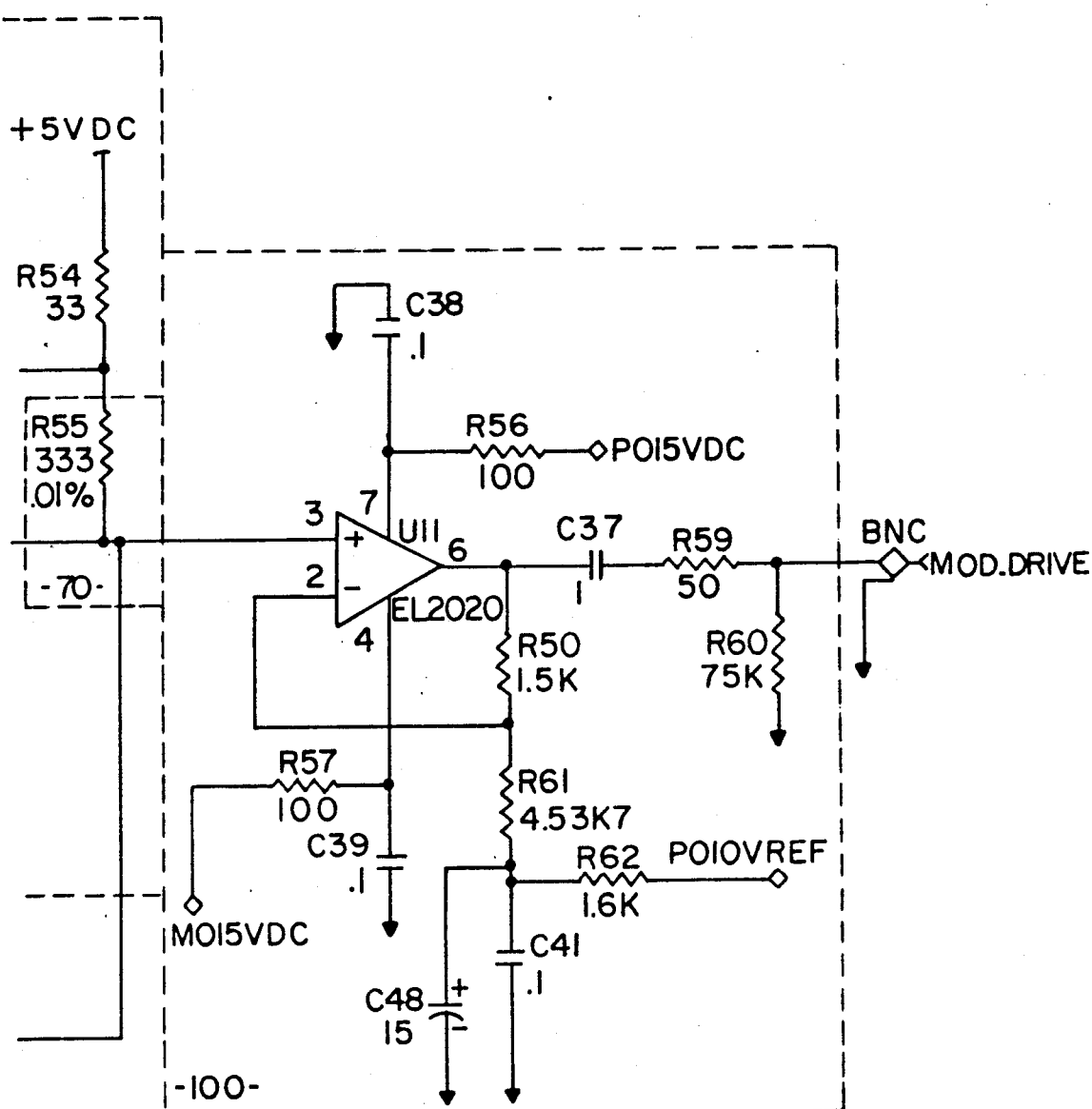

FIG. 6 is a schematic diagram of an electrical circuit representing a possible analog embodiment of the reference signal source 78, the reference summing junction 80, the bias modulator 54, the feedback modulator 62, the modulation summing junction 70, and the third and fourth signal modification means 86 and 100 as diagrammed in FIG. 2.

Phase Modulator Circuit Description

This group of electronic circuits produces the composite signal needed to drive the phase modulator. It produces the $+\pi/2$, $-\pi/2$, $+3\pi/2$, and $-3\pi/2$ optical phase-shift steps and the feedback modulation to null Sagnac-induced phase shifts. To perform these tasks, (digital) controls from the digital reference signal generator 72 and analog signals from the demodulator are required. The analog Sagnac phase nulling and bias modulation gain compensation signals are products of the electronic servomechanism.

A precision variable-current source establishes the average value for each $\pi/2$ step. Precision reference 78 to precision resistors $R_{37}$ and $R_{38}$ establishes nominal step. DELTA_LAMBDA 48 summed through $R_{35}$ normalizes the scale factor. Duplicated current stages yield three required $\pi/2$ phase shift steps. Commutating negates effects of current source mismatches. Logic signals switch shunt transistors $Q_3$, $Q_4$, and $Q_5$ to activate and deactivate current sources.

Sagnac phase shift nulling is accomplished by scaling and switching OMEGA, producing the (+ and −) steps to null the Sagnac phase shift for one transit period, $\tau_o$. A closed switch in the feedback circuit compensates for switch resistance. The dc bias on the signal has no effect. Switching between OMEGA and ground is the same as switching between +OMEGA/2 and −OMEGA/2. A high-speed current-feedback amplifier buffers the modulator output to drive the phase modulator and provides gain matching.

Demodulator Circuit Description

The fiber optic gyro's intensity output 24 feeds a 2404-type photodetector. A UA733 video amplifier increases this signal. Converting from differential to single-ended is done by a current-feedback high-speed amplifier. Parallel gain stages are a precaution to isolate from possible demodulator-switch-induced crosstalk between the fast (primary or OMEGA) and the slow (secondary or DELTA_LAMBDA) servo loops.

Except for switch timing and time constants, the fast 44 (OMEGA) and slow 48 (DELTA$_{13}$ LAMBDA) circuits are alike. Logic signals from the digital reference signal generator (sequencer 72) close the appropriate switch when the signal representing +OMEGA, −OMEGA, +DELTA_LAMBDA, and −DELTA_LAMBDA is present. Outputs of the +OMEGA and the −OMEGA demodulation switches go through low-pass filters to a differential integrator operational amplifier circuit. This signal, which represents estimated Sagnac phase, feeds the modulator circuit described above, and the system A/D converter used to digitize the estimate. The DELTA$_{13}$ LAMBDA demodulator 40 and integrator 48 are similar circuits, controlling bias modulation gain used in compensating scale factor.

Referring to FIG. 6, a detailed electrical schematic diagram of a particular embodiment of the phase modulation portion of FIG. 2 may be seen. A precision (10 Volt) reference 80 is applied to resistors R37 and R38, and a variable (control) voltage 48 is applied to resistor R36. A feedback current comes from the left (A) collector of dual transistor Q1. The summing node R35-R37-Q1 is servoed to null by the precision (OP27) amplifier's adjusting transistor Q-1A's collector current via resistor R37. In controlling the Q1-A collector current, like currents are made available at Q1-B, Q2-A, and/or Q2-B ON/OFF. Logic high(s) turn Q3, Q4, and/or Q5 ON, biasing Q1-B, Q2-A, and/or Q2-B OFF. Logic low(s) turn Q3, Q4, and/or Q5 OFF, gating Q1-B, Q2-A, and/or Q2-B collector current(s) ON. Resistors sum, shift, and attenuate logic levels to drive the selected base(s) high/low with respect to ground. The resulting levels reduce spiking, but are adequate for precise switching. Current levels thus gated into resistor R55 generate output drive levels. Amplifier U11 provides gain matching and buffering to drive the phase modulator. OMEGA is the rate feedback signal 74. Under control of digital reference signal generator 72, two analog switches alternate connection of OP amp U14 between OMEGA and ground. This yields the required rate feedback signal to R69 of the phase modulator. Power supply lines are R-C decoupled from the main supply to prevent extraneous modulation signals from entering and/or leaving the phase modulator.

Figure 7A:
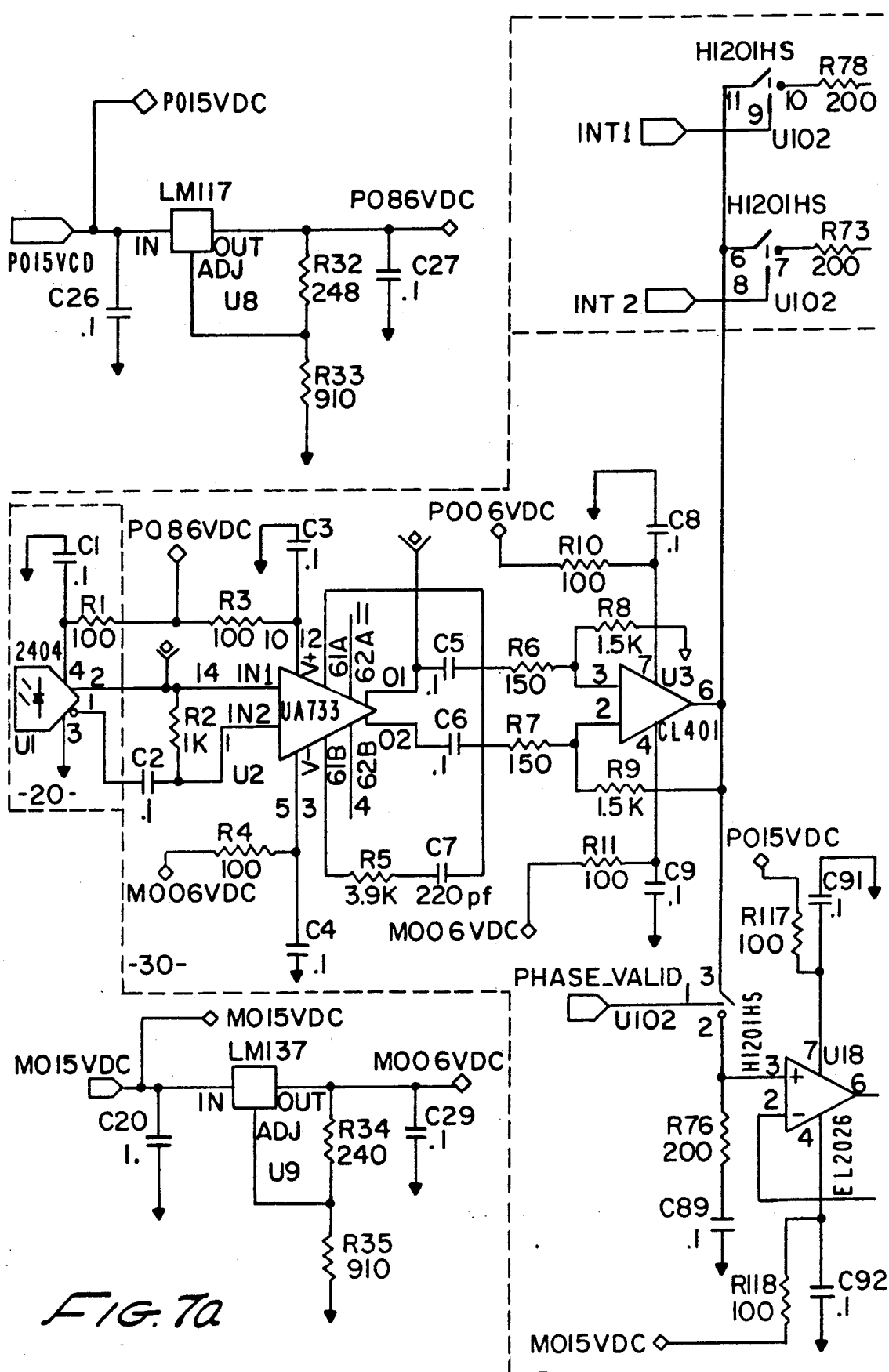
FIGS. 7a and 7b show a schematic diagram of an electrical circuit representing a possible embodiment of photodetector 20, signal modification 30, demodulators 38 and 40, as well as servo controllers 44 and 48 as diagrammed in FIG. 2.
Figure 7B:
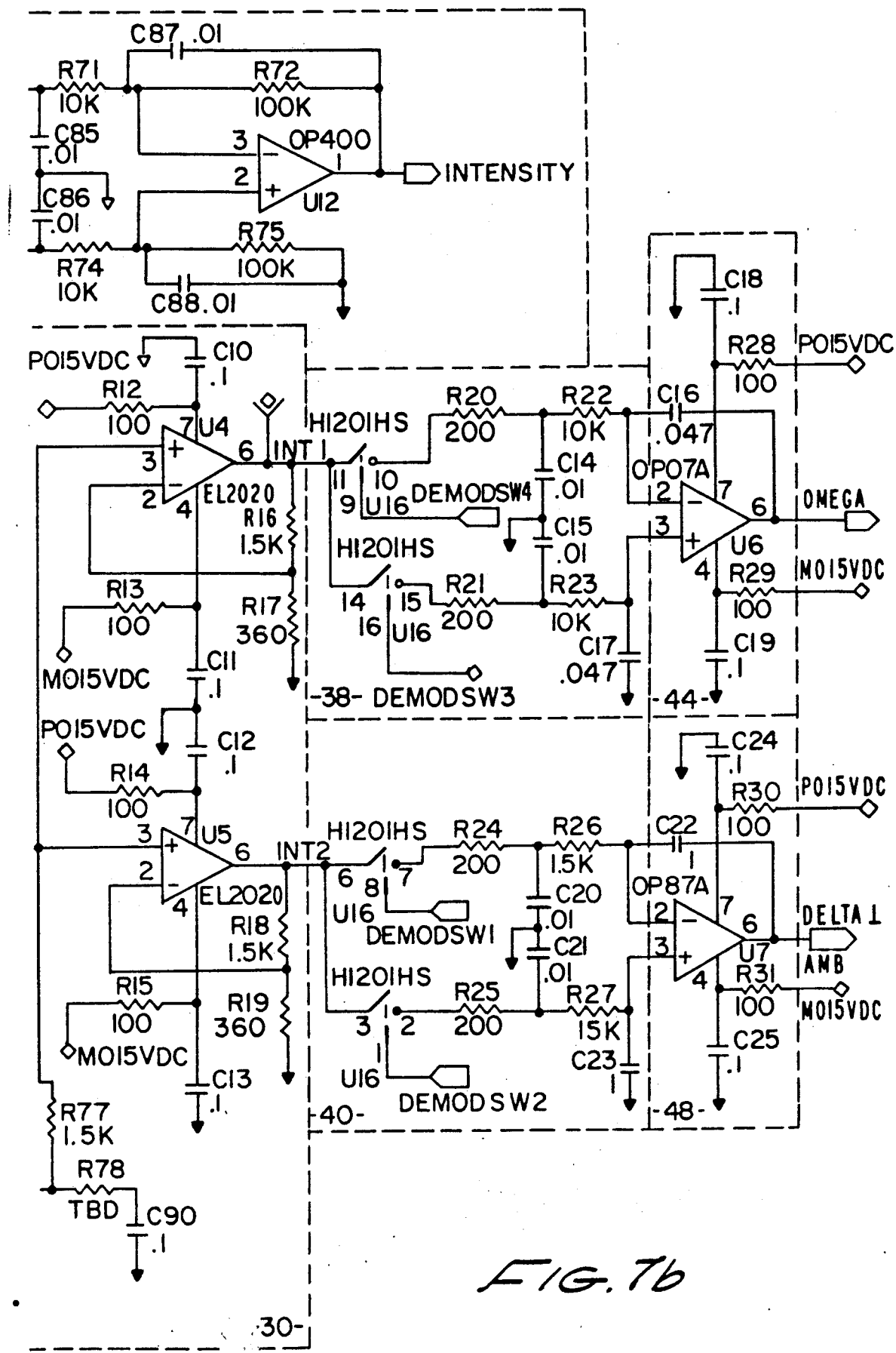

FIG. 7 is a schematic diagram of an electrical circuit representing a possible embodiment of photodetector 20, demodulators 38 and 40, and servo controllers 44 and 48 as diagrammed in FIG. 2. A 2404 photodetector/preamplifier converts light intensity to an electrical signal. The output of the photodetector is coupled to a UA733 wideband video amplifier for further amplification. Compensation of the frequency response of the photodetector is provided by an RC network. The video amplifier has a differential output which is AC-coupled to a CL401 configured as a difference amplifier, where it is further amplified and becomes single ended. Parallel (EL2020) amplifier stages give added gain and reduce possible demodulator crosstalk. The intensity signal at these EL2020 amplifier outputs settles to a valid condition after switching transients die out. The signal remains valid for the transit time of the rotation sensor minus the modulation settling time. Appropriate demodulator switch closure is selected by digital command (I2I4, I1I3, I1I4 OR I2I3). During this period the capacitor charges toward the intensity voltage at a time constant set by 0.01 μFd times (200+R$_{Switch}$). The difference voltage between the upper two 0.01 μFd capacitors is integrated to provide the OMEGA rate feedback signal 42. The voltage difference between the lower two 0.01 μFd capacitors is integrated to provide the DELTA_LAMBDA gain control signal 52. The OMEGA signal is used in processing system dynamic data. This high-speed integrator 44 has a time constant which is dictated by performance requirements. Developmental hardware has a bandwidth of several hundred Hertz. The bandwidth requirement of the DELTA_LAMBDA control loop 48 is much lower. It has an integral gain time constant which is orders of magnitude longer. Power supply leads are RC decoupled from the main supply to attenuate any contamination of signals by various noise sources.

Advantages of the Invention

The phase modulation, intensity demodulation, and control apparatus disclosed above in accordance with the invention possesses the following intrinsic advantages:

(1) Closed-loop operation is possible, with its associated scale factor stability.

(2) A secondary control loop is included for phase modulator gain stabilization.

(3) Digital closing of control loops for enhanced resolution and dynamic range is feasible.

The phase modulation, intensity demodulation, and control apparatus disclosed above in accordance with the invention possesses the following comparative advantages:

(1) Less hardware than in other methods is required for short fiber length gyros.

(2) The intensity signal can be better AC-coupled than in the case of direct digital feedback methods, thereby decreasing sensitivity of the system to electronic voltage offsets and enhancing bias stability.

(3) No roll-over or signal saturation problems exist, as they do in serrodyne methods.

The above-described embodiments are furnished as illustrative of the principles of the invention, and are not intended to define the only embodiment possible in accordance with our teaching. Rather, the invention is to be considered as encompassing not only the specific embodiments shown, but also any others falling within the scope of the following claims.

What is claimed is:

1. Apparatus for phase modulation, intensity demodulation, and control of a rotation-sensing interferometer, said interferometer including means for producing intensity interference electrical signal representing the intensity interference between first and second lightwaves counterpropagating around a closed light path, and further including reciprocal phase modulation means near one end of said closed light path for modulating the phase of said lightwaves, comprising:

bias modulation means for producing a bias modulation signal consisting of a periodic sequence of step signal transitions between at least two signal levels, said bias modulation signal having a step transition frequency that does not lie on even harmonics of the frequency ($2\tau_o$) to the power $-1$ where $\tau_o$ is the time required for light to travel once around said closed light path, said bias modulation means being electrically coupled to said means for producing an intensity interference electrical signal and including output means; and feedback modulation means for producing a feedback modulation signal consisting of a periodic amplitude-modulated square wave having spectral components at harmonics of the bias modulation signal step transition frequency, said feedback modulation means being electrically coupled to said means for producing an intensity electrical signal and including output means.

2. apparatus of claim 1 further comprising:

means for summing said bias modulation signal and said feedback modulation signal to produce a summed modulation signal, having first and second inputs electrically connected to said output means of said bias modulation means and said feedback modulation means, respectively, and including output means; and means for applying said summed modulation signal to said reciprocal phase modulation means, having an input electrically connected to said output of said means for summing, operatively connected to said reciprocal phase modulation means.

3. The apparatus of claim 1 further comprising:

demodulation means for demodulating said intensity interference signal, electrically coupled to said means for producing an intensity interference electrical signal and including output means;

first servo means for generating a Sagnac phase estimate signal, having an input electrically connected to said output of said demodulation means and having an output electrically connected to an input of said feedback modulation means;

second servo means for correcting for gain variation in said phase modulation means, having an input from said demodulation means and an output electrically connected to an input of said bias modulation means; and means for extracting said Sagnac phase estimate signal to provide an estimate of inertial rotation of said closed light path, operatively connected to said first servo means.

4. The apparatus of claim 1 wherein said bias modulation signal has a step transition frequency of $f_o = (t_o)^{-1}$, where $t_o$ is a duration of time spent at each said signal level in said periodic sequence.

5. The apparatus of claim 1 wherein the difference between any two adjacent levels in said periodic sequence of step signal transitions corresponds to a phase difference between said lightwaves on said closed light path of approximately $\pi/2$ radians, and transitions from one said level to another introduce instantaneous non-reciprocal phase shifts between said first and second counterpropagating lightwaves of $-3\pi/2$, $-\pi/2$, $+\pi/2$, or $+3\pi/2$ radians.

6. The apparatus of claim 1 wherein said means for producing said bias modulation signal comprises means for producing a bias modulation signal waveform consisting of a periodic sequence of step signal transitions between a first signal level and a second signal level.

7. The apparatus of claim 1 wherein said bias modulation signal has a waveform consisting of a periodic sequence of step signal transitions between first, second, and third signal levels.

8. The apparatus of claim 1 wherein said bias modulation signal has a waveform consisting of a periodic sequence of step signal transitions between first, second, third, and fourth signal levels.

9. Apparatus for phase modulation, intensity demodulation, and control of a rotation-sensing interferometer, said interferometer including means for producing an intensity interference electrical signal representing the intensity interference between first and second lightwaves counterpropagating around a closed light path, and further including reciprocal phase modulation means near one end of said closed light path for modulating the phase of said lightwaves, comprising:

first signal modification means for operating on said intensity interference signal fed into an input thereof to produce a modified output signal at first and second outputs thereof;

bias modulation means for producing a bias modulation signal, having first and second inputs and an output;

feedback modulation means for producing a feedback modulation signal, having first and second inputs and an output;

first demodulation means for removing a phase servo error signal from an input signal to a first input from said first output of said first signal modification means, said first demodulation means having a second input and an output at which said phase servo error signal appears;

second demodulation means for removing a bias modulation gain servo error signal from an input signal to a first input from said second output of said first signal modification means, said second demodulation means having a second input and an output at which said bias modulation gain servo error signal appears;

a reference summing junction means for summing signals fed into first and second inputs thereof to produce a summed signal at an output thereof, a first portion of said summed signal being sent to said first input of said bias modulation means;

a reference signal source means for producing a reference signal, having an output connected to said second input of said reference summing junction means;

a first servo controller means for controlling said feedback modulation means, having an input connected to said output of said first demodulator means, and an output connected to said feedback modulation means;

a second servo controller means for controlling said bias modulation means, having an input connected to said output of said second demodulator means, and an output connected to said first input of said reference summing junction means;

digital reference signal generation means for generating a plurality of different digital reference signals, having a first modulation reference output connected to said second input of said bias modulation means, a second modulation reference output connected to said second input of said feedback modulation means, a first demodulation reference output connected to said second input of said first demodulation means, and a second demodulation reference output connected to said second input of said second demodulation means;

phase modulator gain compensation means for multiplying first and second input signals, having first and second inputs into which said input signals are fed, respectively, and an output;

inverter means for inverting an input signal applied to an input thereof, providing an inverted signal at an output thereof connected to said second input of said phase modulator gain compensation means;

second signal modification means for operating on an input signal fed into an input thereof from said output of said reference summing junction means to produce a modified signal at said input of said inverter means;

third signal modification means for operating on an input signal from said output of said first servo controller means fed into an input thereof to produce a modified output signal at an output thereof connected to said first input of said phase modulator gain compensation means;

a modulation summing junction means for summing signals fed into first and second inputs thereof from said outputs of said feedback modulation means and said bias modulation means, respectively, to produce a summed phase modulation drive signal at an output thereof; and fourth signal modification means for modifying an input signal at an input thereof to which said summed phase modulation drive signal from said output of said modulation summing junction means is fed to produce a modified signal at an output connected to an input of said phase modulation means.

10. The apparatus of claim 9 wherein said means for producing a bias modulation signal comprises means for producing a signal consisting of a periodic sequence of step signal transitions between at least two signal levels.

11. The apparatus of claim 9 wherein said means for producing a bias modulation signal comprises means for producing a signal for which the difference between any two adjacent levels in said periodic sequence of step signal transitions corresponds to a phase difference of approximately $\pi/2$ radians, and transitions from one said level to another introduce instantaneous non-reciprocal phase shifts between said first and second counterpropagating lightwaves of $-3\pi/2$, $-\pi/2$, $+\pi/2$, or $+3\pi/2$ radians.

12. The apparatus of claim 9 wherein said means for producing said bias modulation signal comprises means for producing a bias modulation signal waveform consisting of a periodic sequence of step signal transitions between a first signal level and a second signal level.

13. The apparatus of claim 9 wherein said means for producing said bias modulation signal comprises means for producing a bias modulation signal having a waveform consisting of a periodic sequence of step signal transitions between first, second, and third signal levels.

14. The apparatus of claim 9 wherein said means for producing said bias modulation signal comprises means for producing a bias modulation signal having a waveform consisting of a periodic sequence of step signal transitions between first, second, third, and fourth signal levels.

15. The apparatus of claim 9 wherein said means for producing a bias modulation signal comprises means for producing a bias modulation signal having a step transition frequency of $f_o = (t_o)$, where $t_o$ is a duration of time spent at each said signal level in said periodic sequence.

16. The apparatus of claim 9 wherein said means for producing a feedback modulation signal comprises means for producing a signal consisting of a periodic amplitude-modulated square wave.

17. The apparatus of claim 9 wherein said means for producing said feedback modulation signal comprises means for producing a feedback modulation signal having spectral components at harmonics of said step transition frequency of said bias modulation signal, and the power in said feedback signal is distributed over frequencies other than even harmonics of a frequency equal to $\frac{1}{2}\tau_o$, where $\tau_o$ is the time required for light to travel around said closed light path.

18. The apparatus of claim 9 wherein each of said first, second, third and fourth signal modification means comprises means for changing the ratio of the amplitude of said output signal to the amplitude of said input signal.

19. The apparatus of claim 9 wherein each of said first and fourth signal modification means comprises buffering means for buffering said input signal from said output signals.

20. The apparatus of claim 9 wherein said first signal modification means comprises analog-to-digital conversion means for converting said input signal into a digital output signal.

21. The apparatus of claim 9 wherein said second signal modification means comprises filtering means for filtering said input signal to produce a filtered output signal.

22. The apparatus of claim 9 wherein said third signal modification means comprises filtering means for filtering said input signal to produce a filtered output signal.

23. The apparatus of claim 9 wherein said fourth signal modification means comprises digital-to-analog conversion means for converting said input signal into an analog output signal.

24. The apparatus of claim 9 wherein said first and second servo controller means comprise analog electronics.

25. The apparatus of claim 9 wherein said first and second servo controller means comprise digital electronics.

26. The apparatus of claim 9 wherein said reference summing junction means and said modulation summing junction means each comprise a summing amplifier.

27. The apparatus of claim 9 wherein said reference summing junction means and said modulation summing junction means each comprise an analog equivalent of a summing amplifier.

28. The apparatus of claim 9 wherein said reference summing junction means and said modulation summing junction means each comprise digital electronics.

29. The apparatus of claim 9 wherein said digital reference signal generator means comprises a counter-sequenced memory.

30. The apparatus of claim 9 wherein said first and second demodulation means comprise analog switching demodulation electronics.

31. The apparatus of claim 9 wherein said first and second demodulation means comprise digital demodulation electronics.

32. The apparatus of claim 9 wherein said bias modulation means and said feedback modulation means comprise chopper-based circuitry.

33. The apparatus of claim 9 wherein said bias modulation means comprises an analog equivalent of chopper-based circuitry providing multistate signal transitions.

34. The apparatus of claim 9 wherein said feedback modulation means comprises an analog equivalent of chopper-based circuitry providing an amplitude-modulated square wave output.

35. The apparatus of claim 9 wherein said bias modulation means and said feedback modulation means comprise digital circuitry.

36. A method of controlling a rotation-sensing interferometer, said interferometer including means for producing an intensity interference electrical signal representing the intensity interference between first and second lightwaves counterpropagating around a closed light path, and further including reciprocal phase modulation means near one end of said closed light path for modulating the phase of said lightwaves, that includes the steps of:

producing a bias modulation signal comprising a periodic sequence of step signal transitions between at least two signal levels, said bias modulation signal having a step transition frequency that does not lie on even harmonics of the frequency $(2\tau_o)^{-1}$, where $\tau_o$ is the time required for light to travel once around said closed light path; and producing a feedback modulation signal comprising a periodic amplitude-modulated square wave having spectral components at harmonics of the bias modulation signal step transition frequency.

37. The method of claim 36 further comprising summing said bias modulation signal and said feedback modulation signal to produce a summed modulation signal, and applying said summed modulation signal to said phase modulation means.

38. The method of claim 36 further comprising:
demodulating said intensity interference signal;
generating a Sagnac phase estimate signal;
correcting for gain variation in said phase modulation means; and
extracting said Sagnac phase estimate signal to provide an estimate of inertial rotation of said closed light path.

39. The method of claim 36 wherein producing said bias modulation signal comprises producing a signal having a step transition frequency of $f_o=(t_o)^{-1}$, where $t_o$ is a duration of time spent at each said signal level in said periodic sequence.

40. The method of claim 36 wherein producing said bias modulation signal comprises producing a signal in which the difference between any two adjacent levels in said periodic sequence of step signal transitions corresponds to a phase difference of $\pi/2$ radians, and transitions from one said level to another introduce instantaneous non-reciprocal phase shifts between said first and second counterpropagating lightwaves of $-3\pi/2$, $-\pi/2$, $+\pi/2$, or $+3\pi/2$ radians.

41. The method of claim 36 wherein producing said bias modulation signal comprises producing a bias modulation signal waveform consisting of a periodic sequence of step signal transitions between a first signal level and a second signal level.

42. The method of claim 36 wherein producing said bias modulation signal comprises producing a signal having a waveform consisting of a periodic sequence of step signal transitions between first, second, and third signal levels.

43. The method of claim 36 wherein producing said bias modulation signal comprises producing a signal having a waveform consisting of a periodic sequence of step signal transitions between first, second, third and fourth signal levels.

44. A method of phase modulation, intensity demodulation, and control of a rotation-sensing interferometer, said interferometer including means for producing an intensity interference signal representing the intensity interference between first and second lightwaves counterpropagating around a closed light path, and further including reciprocal phase modulation means near one end of said closed light path for modulating the phase of said lightwaves, comprising:

operating on said intensity interference signal to produce a modified intensity interference signal;
producing a bias modulation signal with a bias modulation means;
producing a feedback modulation signal with a feedback modulation signal means;
demodulating a phase servo error signal with a first demodulation means from said modified intensity interference electrical signal;
demodulating a bias modulation gain servo error signal with a second demodulation means from said modified intensity interference signal;
operating on said phase servo error signal with a phase servo controller to generate a phase servo control signal;
producing a gain reference signal;
operating on said bias modulation gain servo error signal with a bias modulation gain servo controller to generate a bias modulation gain servo control signal;
summing said bias modulation gain servo control signal and said gain reference signal to produce a summed bias modulation gain servo control signal;
generating first and second modulation reference signals and first and second demodulation reference signals;
controlling said bias modulation means by applying a first portion of said summed bias modulation gain servo control signal to a first input of said bias modulation means and applying said first modulation reference signal to a second input of said bias modulation means;
controlling said feedback modulation means by applying a first portion of said phase servo control signal to a first input of said feedback modulation means and applying said second modulation reference to a second input of said feedback modulation means;
operating on a second portion of said summed bias modulation gain servo control signal to produce a modified summed bias modulation gain servo control signal;
operating on a second portion of said phase servo control signal to produce a modified phase servo control signal;
inverting said bias modulation gain servo control signal to produce an estimated phase modulator gain signal;
multiplying said phase modulator gain signal and said modified phase servo control signal to produce a rotation rate estimate signal;
summing said bias modulation signal and said feedback modulation signal to produce a summed modulation signal;
operating on said summed modulation signal to produce a modified summed modulation signal; and
applying said modified summed modulation signal to said phase modulation means.

45. The method of claim 44 wherein producing said bias modulation signal comprises producing a signal consisting of a periodic sequence of step signal transitions between at least two signal levels.

46. The method of claim 44 wherein producing said feedback modulation signal comprises producing a signal consisting of a periodic amplitude-modulated square wave.

47. The method of claim 44 wherein producing said bias modulation signal comprises producing a signal having a step transition frequency of $f_o=(t_o)^{-1}$, where $t_o$ is a duration of time spent at each said signal level in said periodic sequence.

48. The method of claim 44 wherein producing said feedback modulation signal comprises producing a signal having spectral components at harmonics of said step transition frequency of said bias modulation signal, and the power in said feedback modulation signal is distributed over frequencies other than even harmonics of a frequency equal to $\frac{1}{2}\tau_o$, where $\tau_o$ is the time required for light to travel around said closed light path.

49. The method of claim 44 wherein producing said bias modulation signal comprises producing a signal in which the difference between any two adjacent levels in said periodic sequence of step signal transitions corresponds to a phase difference of $\pi/2$ radians between said first and second lightwaves in said closed light path, and transitions from one said level to another introduce instantaneous non-reciprocal phase shifts between said first and second counterpropagating lightwaves of $-3\pi/2$, $-\pi/2$, $+\pi/2$, or $+3\pi/2$ radians.

50. The method of claim 44 wherein said means for producing said bias modulation signal comprises means for producing a bias modulation signal waveform consisting of a periodic sequence of step signal transitions between a first signal level and a second signal level.

51. The method of claim 44 wherein said means for producing said bias modulation signal comprises means for producing a signal having a waveform consisting of a periodic sequence of step signal transitions between first, second, and third signal levels.

52. The method of claim 44 wherein said means for producing said bias modulation signal comprises means for producing a signal having a waveform consisting of a periodic sequence of step signal transitions between first, second, third, and fourth signal levels.

53. The method of claim 44 wherein said operating on said intensity interference signal and on said summed modulation signal comprises buffering each said signal.

54. The method of claim 44 wherein said operating on said intensity interference signal comprises converting said signal from analog to digital form.

55. The method of claim 44 wherein said operating on said second portion of said summed bias modulation gain servo control signal comprises filtering said signal.

56. The method of claim 44 wherein said operating on said second portion of said phase servo control signal comprises filtering said signal.

57. The method of claim 44 wherein said operating on said summed modulation signal comprises converting said signal from digital to analog form.

58. The method of claim 44 wherein said controlling comprises controlling with analog electronics.

59. The method of claim 44 wherein said summing comprises analog summing.

60. The method of claim 44 wherein generating said digital reference signals comprises sequencing a memory.

61. The method of claim 44 wherein said demodulating comprises analog electronic switching.

62. The method of claim 44 wherein said demodulating comprises digital electronic demodulating.

63. The method of claim 44 wherein producing said bias modulation signal and said feedback modulation signal comprises producing said signals with chopper-based circuitry.

64. The method of claim 44 wherein said producing said bias modulation signal comprises producing said signal with an analog equivalent of chopper-based circuitry providing multistate signal transitions.

65. The method of claim 44 wherein producing said feedback modulation signal comprises producing said signal with an analog equivalent of chopper-based circuitry providing an amplitude-modulated square wave output.

66. The method of claim 44 wherein producing said bias modulation signal and said feedback modulation signal comprises producing said signals with digital circuitry.

67. The method of claim 36 further comprising extracting a Sagnac phase estimate signal from said feedback modulation signal to provide an estimate of inertial rotation of said close light path.

68. The method of claim 36 or claim 67 further comprising producing said bias modulation signal from highspeed switching circuitry.

69. The method of claim 36 or claim 67 comprising producing said feedback modulation signal using chopper-based switching circuitry.

* * * * *